United States Patent
Torgersrud et al.

(10) Patent No.: US 9,621,504 B2
(45) Date of Patent: Apr. 11, 2017

(54) METHOD AND SYSTEM FOR SECURE SOCIAL NETWORKING ON FEATURE PHONES

(71) Applicant: Telmate LLC, San Francisco, CA (US)

(72) Inventors: Richard Torgersrud, San Francisco, CA (US); John Satori Yamasaki, San Francisco, CA (US)

(73) Assignee: Intelmate LLC, San Francisco, CA (US)

( * ) Notice: Subject to any disclaimer, the term of this patent is extended or adjusted under 35 U.S.C. 154(b) by 553 days.

(21) Appl. No.: 13/844,049

(22) Filed: Mar. 15, 2013

(65) Prior Publication Data

US 2014/0280632 A1 Sep. 18, 2014

(51) Int. Cl.
*H04L 12/58* (2006.01)
*H04L 29/06* (2006.01)

(52) U.S. Cl.
CPC ............ *H04L 51/32* (2013.01); *H04L 63/102* (2013.01); *H04L 63/083* (2013.01)

(58) Field of Classification Search
USPC ................................................ 709/206–207
See application file for complete search history.

(56) References Cited

U.S. PATENT DOCUMENTS

| 6,832,245 | B1* | 12/2004 | Isaacs | G06Q 10/107 709/206 |
| 7,765,265 | B1* | 7/2010 | Granito | G06Q 10/107 707/999.003 |
| 8,978,116 | B1* | 3/2015 | Spertus et al. | 726/7 |
| 9,002,858 | B1* | 4/2015 | Dassa | G06Q 30/0202 705/319 |
| 2004/0236721 | A1* | 11/2004 | Pollack | G06F 17/30699 |
| 2006/0135135 | A1* | 6/2006 | Rybak | 455/414.1 |
| 2006/0245559 | A1* | 11/2006 | Hodge | H04L 12/5835 379/88.19 |
| 2007/0271607 | A1* | 11/2007 | Roskind | H04L 63/0272 726/15 |
| 2008/0039053 | A1* | 2/2008 | Polozola | H04L 12/1895 455/412.2 |
| 2008/0040781 | A1* | 2/2008 | Keiser | H04L 12/5835 726/5 |
| 2009/0070433 | A1* | 3/2009 | Karstens | H04L 12/581 709/206 |

(Continued)

*Primary Examiner* — Backhean Tiv
(74) *Attorney, Agent, or Firm* — Osha Liang LLP

(57) ABSTRACT

A method for handing messages on a secure social network (SSN) includes receiving a message comprising a recipient name from a SSN member sender, retrieving a list of SSN member names approved to communicate with the SSN member sender, and determining that recipient name matches a first SSN member name and a second member name stored in the list of SSN member names, where the first SSN member name identifies an inmate of a controlled facility. The method further includes retrieving a first period of time since a previous communication between the SSN member sender and the first SSN member name, retrieving a second period of time since a previous communication between the SSN member sender and the second SSN member name, and sending the message to the inmate based on a comparison of the first period of time to the second period of time.

29 Claims, 16 Drawing Sheets

(56) References Cited

U.S. PATENT DOCUMENTS

| | | | |
|---|---|---|---|
| 2009/0244023 A1* | 10/2009 | Kim | G06F 3/0416 |
| | | | 345/173 |
| 2011/0106894 A1* | 5/2011 | Hodge et al. | 709/206 |
| 2012/0066212 A1* | 3/2012 | Jennings | G06F 17/30144 |
| | | | 707/723 |
| 2012/0166931 A1* | 6/2012 | Alonso | G06Q 30/0201 |
| | | | 715/234 |
| 2012/0197995 A1* | 8/2012 | Caruso | G06F 17/3089 |
| | | | 709/204 |
| 2013/0226678 A1* | 8/2013 | Perna | H04L 51/04 |
| | | | 705/14.4 |
| 2013/0290337 A1* | 10/2013 | Lansford | G06F 17/30598 |
| | | | 707/738 |
| 2013/0332162 A1* | 12/2013 | Keen | G10L 15/26 |
| | | | 704/235 |
| 2014/0139555 A1* | 5/2014 | Levy | 345/636 |
| 2014/0280632 A1* | 9/2014 | Torgersrud | H04L 51/32 |
| | | | 709/206 |

* cited by examiner

METHOD AND SYSTEM FOR SECURE SOCIAL NETWORKING ON FEATURE PHONES

CROSS-REFERENCE TO RELATED APPLICATIONS

This application is related to U.S. patent application Ser. No. 13/438,940 filed on Apr. 4, 2012, entitled "Secure Social Network," and U.S. patent application Ser. No. 13/490,054 filed on Jun. 6, 2012, entitled "System and Method for Identity Verification in a Detention Environment." U.S. patent application Ser. No. 13/438,940 and U.S. patent application Ser. No. 13/490,054 are incorporated by reference in their entirety.

BACKGROUND

Controlled facilities, such as a jail, prison, secure detention environment, controlled facility, detention facility, secured hospital, or addiction treatment facility, house large populations of individuals in confinement, which presents unique administrative challenges. In such detention environments, detained individuals, such as prisoners, offenders, convicts, military personnel, patients, government cleared personnel, or other detainees, frequently desire to communicate with individuals outside the detention environment such as friends or family members.

SUMMARY

In general, in one aspect, the invention relates to a method for handing messages on a secure social network (SSN). The method includes receiving a message comprising a recipient name from a SSN member sender, retrieving a list of SSN member names approved to communicate with the SSN member sender, and determining that recipient name matches a first SSN member name and a second member name stored in the list of SSN member names, where the first SSN member name identifies an inmate of a controlled facility. The method further includes retrieving a first period of time since a previous communication between the SSN member sender and the first SSN member name, retrieving a second period of time since a previous communication between the SSN member sender and the second SSN member name, and sending the message to the inmate based on a comparison of the first period of time to the second period of time.

In general, in one aspect, the invention relates to a non-transitory computer readable medium comprising instructions that, when executed by a processor, perform a method for handing messages on a secure social network (SSN). The method includes receiving a message comprising a recipient name from a SSN member sender, retrieving a list of SSN member names approved to communicate with the SSN member sender, and determining that recipient name matches a first SSN member name and a second member name stored in the list of SSN member names, where the first SSN member name identifies an inmate of a controlled facility. The method further includes retrieving a first period of time since a previous communication between the SSN member sender and the first SSN member name, retrieving a second period of time since a previous communication between the SSN member sender and the second SSN member name, and sending the message to the inmate based on a comparison of the first period of time to the second period of time.

In general, in one aspect, the invention relates to a system for reviewing a posting to a secure social network (SSN). The system includes a database server and an application server. The database server includes a list of SSN member names approved to communicate with a SSN member sender including a first SSN member name identifying an inmate of a controlled facility and a second SSN member name. The application server is configured to receive a message comprising a recipient name from the SSN member sender, retrieve the list of SSN member names, and determine that recipient name matches the first SSN member name and the second member name stored in the list of SSN member names. The application server is further configured to retrieve a first period of time since a previous communication between the SSN member sender and the first SSN member name, retrieve a second period of time since a previous communication between the SSN member sender and the second SSN member name, and send the message to the inmate based on a comparison of the first period of time to the second period of time.

Other aspects of the invention will be apparent from the following description and the appended claims.

DETAILED DESCRIPTION

Figure 1:
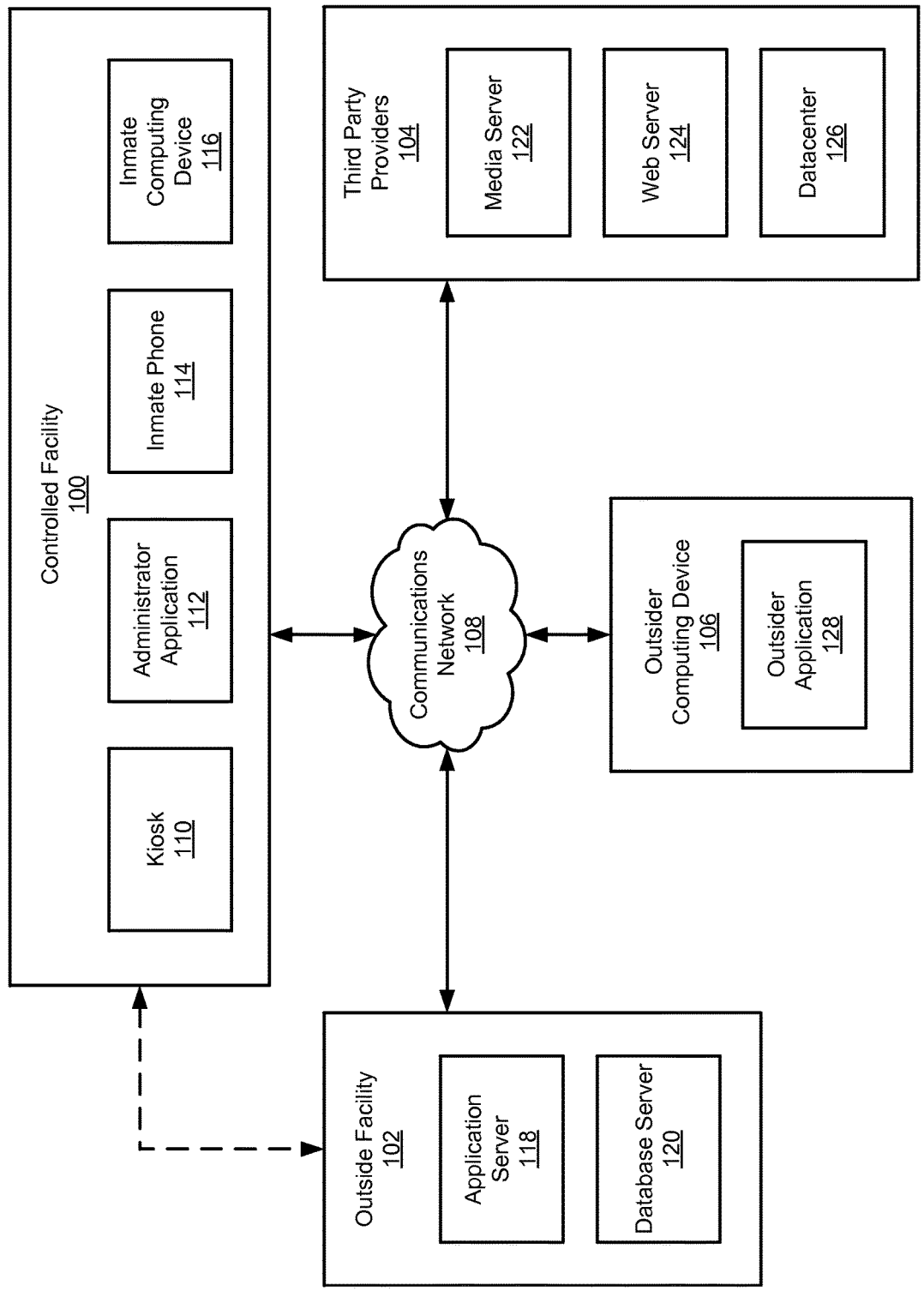
FIG. 1 shows a diagram of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for facilitating communication between inmates residing in a controlled facility and outsiders. Specifically, embodiments of the invention may be used to receive messages from one member of the secure social network, and transmit the message to another member of the secure social network.

Embodiments of the invention may include interactions with a secure social network. In one embodiment of the invention, a secure social network is a network application that facilitates and secures the exchange or transmission of information between two or more parties in which at least one of those parties is subject to special security or law enforcement restrictions, or is subject to the controls of a controlled facility. Exchanged or transmitted information may be member generated, such as a photo or a video message, or it may be member curated, such as a news headline, a famous quote, or a sports score.

FIG. 1 shows a diagram of a system in accordance with one or more embodiments of the invention. As shown in FIG. 1, the system includes a controlled facility (100), an outside facility (102), third party providers (104), and an outsider computing device (106) each communicatively coupled to a communications network (108). The controlled facility (100) may include, but is not limited to, a kiosk (110), an administrator application (112), an inmate phone (114), and an inmate computing device (116). The outside facility (102) may include an application server (118) and a database server (120). The third party providers (104) may include a media server (122), a web server (124), and a datacenter (126). The outsider computing device (106) may include an outsider application (128).

In one or more embodiments of the invention, a controlled facility (100) is an access-restricted location. Examples of controlled facilities (e.g., controlled facility (100)) include, but are not limited to, detention environments (e.g., jails, prisons, etc.), immigration detention centers, military centers, government secure sites, law enforcement holding structures, secure business complexes, and psychiatric hospitals.

In one or more embodiments of the invention, an inmate is a person within a controlled facility (100) who is subject to one or more restrictions, primarily to his or her freedom or rights. Examples of inmates include, but are not limited to, prisoners, wards of the state, parolees, employees working in a secure business complex, temporary or long-term internees, patients, military personnel, uncharged suspects, and refugees. Inmate restrictions may be part of a court-imposed sentence on an inmate, while others may be specific to the controlled facility (100) to which the inmate is subject to the control of. Restrictions may include limitations on an inmate's physical movement (i.e., physical restrictions) and limitations on the inmate's ability to communicate (i.e., communication restrictions). Communication restrictions include inmate use restrictions, inmate target restrictions, and device use restrictions.

In one or more embodiments of the invention, inmate use restrictions are limitations on an inmate's general ability to communicate with visitors and/or outsiders. Inmate use restrictions may include, for example, periods of time in which an inmate is not allowed to communicate with outsiders or visitors (e.g., between 10 PM and 8 AM, during an imposed one-week punitive period, etc.) and limitations based on lack of funds (e.g., insufficient commissary account balance to initiate a communication).

In one or more embodiments of the invention, inmate target restrictions are limitations on the target or source of a communication with the inmate. Inmate target restrictions may be specific outsiders or visitors with whom the inmate is not allowed to communicate (e.g., the victim of a crime perpetrated by the inmate, etc.). Inmate target restrictions may also include types of people with whom the inmate is not allowed contact (e.g., outsiders who are ex-cons, minors under the age of 18, etc.).

In one or more embodiments of the invention, device use restrictions are restrictions based on the condition or state of the communication device used by the inmate. Device use restrictions include, for example, limitations based on the location of the inmate's mobile device, limitations imposed based on a determination that the device has been tampered with, etc.

In one or more embodiments of the invention, an outsider is a person outside the controlled facility (100) who may be the source or target of a communication with an inmate. An outsider who enters the controlled facility (100) for the purpose of communicating with an inmate is referred to as a visitor.

In one or more embodiments of the invention, the kiosk (110) is a computing system with functionality to facilitate communication between an inmate and a visitor or outsider. Such communication facilitation may include creating a system identity data item or secure social networking account, adding or importing contact information for outsiders with whom the inmate wishes to communicate, uploading media (e.g., photos, videos, audio, and text) to, or viewing media from, a secure social network, sending or receiving messages or other media, acting as an endpoint for voice and video communication between an inmate and a visitor or outsider, scheduling a communication, and managing a commissary or communication account. Further detail about kiosks (e.g., kiosk (110)) is provided in FIG. 2, FIG. 5A, FIG. 5B, and FIG. 6.

In one or more embodiments of the invention, the administrator application (112) is a process or group of processes executing on a computing system with functionality to enable an administrator to create, remove, and/or enforce one or more restrictions on an inmate. In one or more embodiments of the invention, an administrator is a person associated with the controlled facility charged with enforcing one or more restrictions. Examples of administrators include, but are not limited to, prison guards, orderlies, wardens, prison staff, jailers, information technology technicians, system administrators, and law enforcement agents. Using the administrator application, an administrator may retrieve or alter the identity data item and/or secure social network account of an inmate, visitor, or outsider. Further detail about the administrator application (112) is provided in FIG. 2.

In one or more embodiments of the invention, the inmate phone (114) is a device with functionality to send and receive audio communications between an inmate and an outsider or visitor. In one or more embodiments of the invention, the inmate phone (114) is a stationary (i.e., non-mobile) device. Further, a single inmate phone (114) may be used by more than one inmate. Further detail about the inmate phone (114) is provided in FIG. 2.

In one or more embodiments of the invention, the inmate computing device (116) is a computing device with functionality to enable an inmate to communicate with a visitor or outsider. Specifically, the inmate computing device (116) may be used to send or receive text messages and/or initiate or receive voice or video calls. In one or more embodiments of the invention, the inmate computing device (116) also enables an inmate to access a secure social network. Specifically, the inmate computing device (116) may be used to upload media to, or view media from, a secure social network account of the inmate or another secure social network member. In one or more embodiments of the invention, the inmate computing device (116) is a mobile computing device (e.g., a smartphone, a laptop, a tablet, etc.). Further detail about the inmate computing device (116) is provided in FIG. 2 and FIG. 6.

In one or more embodiments of the invention, the elements within the controlled facility (100) are communicatively coupled to the communications network (108). In one or more embodiments of the invention, the communications network (108) is a collection of computing systems and other hardware interconnected by communication channels. The communications network (108) may include networks that are exclusively or primarily used for a single type of communication, such as a telephone network (e.g., Plain Old Telephone System (POTS)), and/or networks used for a wide array of communication types, such as the Internet through Voice over IP (VoIP). Communication channels used by the communications network (108) may include, for example, telephone lines, networking cables, wireless signals, radio waves, etc. Fees charged and payments received by the provider(s) of the communications network (108) may involve multiple parties, including a service provider of the outside facility (102), the management of the controlled facility (100), and provider(s) of the communications network (108). In one or more embodiments of the invention, fees may be split between multiple parties based on the terms of underlying agreements or contracts between the parties. Further, rebates, reimbursements, and/or refunds may be afforded to and paid to the management of the controlled facility (100) based on the terms of underlying agreements or contracts between the parties. For example, the management of the controlled facility (100) may receive a rebate from the service provider of the services provided to inmates based on such factors as the volume of use, the dollar amount, and/or the frequency of use.

In one or more embodiments of the invention, the outside facility (102) is a group of computing systems located outside of the controlled facility (100). Specifically, the outside facility (102) may house system elements with functionality to facilitate communication between inmates and outsiders, access communication data between inmates and outsiders, and enforce one or more restrictions imposed on inmates and inmate communications. In one or more embodiments of the invention, the outside facility (102) is connected directly to the controlled facility (100) bypassing a generally accessible communications network (communications network (108)). One or more of the components within the outside facility (102) may alternatively be located within the controlled facility (100) or within the third party providers (104).

In one or more embodiments of the invention, the application server (118) is a computing system with functionality to authenticate an inmate, outsider, administrator, reviewer, or investigator for access to system functionality (e.g., initiating voice or video calls, sending text messages, etc.) or data stored on the database server (120) (e.g., inmate identities, communications between inmates and outsiders, etc.). The application server may authenticate inmates, outsiders, administrators, reviewers, and/or investigators using passwords, biometric data, digital access codes, and/or physical access devices. Further detail about the application server (118) is provided in FIG. 3.

In one or more embodiments of the invention, the database server (120) is a computing system with functionality to store identities used to authenticate inmates, outsiders, administrators, reviewers, and/or investigators. Such identities may include verified data used to compare to verification data provided by the inmate, outsider, administrator, reviewer, or investigator to authenticate the inmate, outsider, administrator, reviewer, or investigator.

In one or more embodiments of the invention, the database server (120) also stores communication data about communications between an inmate and an outsider or visitor. Such communication data may include, for example, a recording of a video call, the length of a voice call, the frequency of video calls, sent and received text messages, etc. The database server (120) may also store media submitted to a secure social network before, during, and/or after the media has been reviewed. Further detail about the database server (120) is provided in FIG. 3.

In one or more embodiments of the invention, the third party providers (104) are computing systems that provide network application and data storage services (i.e., cloud computing services). Third party providers (104) may include service providers used directly by inmates and outsiders, such as photo sharing services, general social networking sites, and digital music retailers. Third party providers (104) may include service providers employed by administrators and for use by inmates and outsiders, such as audio and video streaming applications, conferencing applications, and secure social network media storage. One or more of the components within the third party providers (104) may alternatively be located within the controlled facility (100) or the outside facility (102).

In one or more embodiments of the invention, the media server (122) is a computing system or group of computing system with functionality to provide network application services to facilitate communication between an inmate and an outsider, and to facilitate access to a secure social network. Such services include, but are not limited to, VoIP services, video conferencing services, and media streaming services.

In one or more embodiments of the invention, the web server (124) is a computing system or group of computing system with functionality to provide an interface to access and interact with webpages and other network application services. In one or more embodiments of the invention, the web server (124) is a type of media server (122).

In one or more embodiments of the invention, the datacenter (126) is a computing system or group of computing system with functionality to provide an interface to access and interact with data stored on one or more data servers (not shown). In one or more embodiments of the invention, the datacenter (126) is a type of media server (122).

In one or more embodiments of the invention, the outsider computing device (106) is a computing device with functionality to execute the outsider application (128). In one or more embodiments of the invention, the outsider computing device (106) is a mobile computing device (e.g., a smartphone, a laptop, a tablet, etc.). Further detail about the outsider computing device (106) is provided in FIG. 6.

In one or more embodiments of the invention, the outsider application (128) is a process or group of processes (in software, firmware, hardware, or combination thereof) with functionality to enable communication between an outsider and an inmate. Specifically, the outsider application (128) may be used to send or receive text messages and/or initiate or receive voice or video calls. In one or more embodiments of the invention, the outsider application (128) also enables an outsider to access a secure social network. Specifically, the outsider application (128) may be used to upload media to, or view media from, a secure social network account of the outsider, an inmate, other secure social network member.

Figure 2:
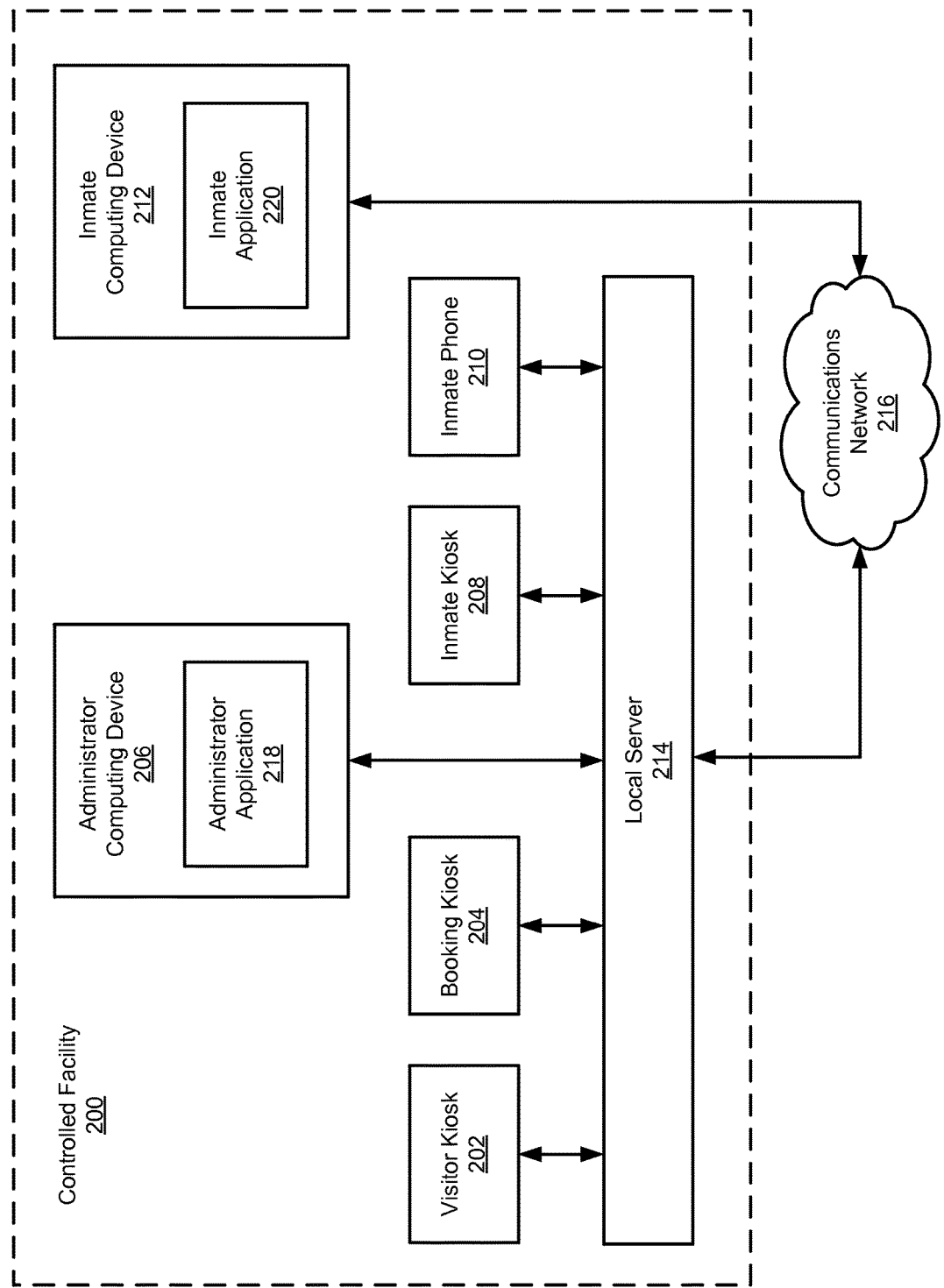
FIG. 2 shows a diagram of a controlled facility in accordance with one or more embodiments of the invention.

FIG. 2 shows a controlled facility in accordance with one or more embodiments of the invention. As shown in FIG. 2, the controlled facility (200) may include a visitor kiosk (202), a booking kiosk (204), an administrator computing device (206), an inmate kiosk (208), an inmate phone (210), an inmate computing device (212), and a local server (214). The inmate computing device (212) and the local server (214) are communicatively coupled to the communications network (216). The administrator computing device (206) includes an administrator application (218). The inmate computing device (212) includes an inmate application (220).

In one or more embodiments of the invention, the visitor kiosk (202) is a computing system with functionality to facilitate communication between an inmate and a visitor. Specifically, the visitor kiosk (202) may be a combination of computing hardware and software used by a visitor to make and receive voice and video calls to/from an inmate residing in the same controlled facility (200) or another controlled facility (not shown). The visitor kiosk (202) may also be used to schedule a voice or video call with an inmate for a future date. Further, the visitor kiosk (202) may also include the functionality to exchange media (e.g., photos, videos, and audio) with an inmate residing in the controlled facility (200). The visitor kiosk (202) may include functionality to generate such media, such as a camera, microphone, keyboard, and software to record or otherwise create media to send to an inmate. Such media may be subject to review before being delivered.

In one or more embodiments of the invention, a visitor wanting to use a visitor kiosk (202) may be required to participate in an authentication process to verify the identity of the visitor. The authentication process may include creating an identity data item and verified data for storage and later comparison. The verified data used for authentication may be a username and password combination and/or biometric information about the visitor.

In one or more embodiments of the invention, the visitor kiosk (202) includes functionality to access a secure social network. Specifically, the visitor kiosk (202) may be used by a visitor to create and manage a secure social network account. The visitor kiosk (202) may also be used by a visitor to upload digital media to the visitor's secure social network account or the account of another secure social network member. The visitor kiosk (202) may further be used to view digital media uploaded to the visitor's social network account or the account of another secure social network member.

In one or more embodiments of the invention, the visitor kiosk (202) includes functionality to manage a commissary account for one or more inmates. Specifically, a visitor may use a visitor kiosk (202) to add money to the commissary account of an inmate in the controlled facility (200), view a transaction history of the commissary account, transfer funds between commissary accounts, and/or remove funds from a commissary account. Further detail about the visitor kiosk (202) is provided in FIG. 5A and FIG. 5B.

In one or more embodiments of the invention, the booking kiosk (204) is a computing system with functionality to aid administrators in admitting an inmate into a controlled facility (e.g., controlled facility (200)). Specifically, the booking kiosk (204) may include functionality to create or update an inmate identity data item. Specifically, the booking kiosk (204) may be used to obtain verified data (e.g., passwords, biometric data, etc.) and save the verification data in one or more identity data items for the inmate. The verified data may then be used to authenticate the inmate (e.g., to access the communications network (216), etc.). In one or more embodiments of the invention, the booking kiosk may also be used to associate one or more restrictions with the inmate via the inmate's identity data item.

In one or more embodiments of the invention, the booking kiosk (204) includes functionality to input contact information for visitors, outsiders, administrators, or other inmates with whom the inmate wants to communicate. Such contact information may then be associated with the inmate's identity data item, and may be used to initiate a voice or video call, or otherwise transmit media to visitors, outsiders, or other inmates. Further, in one or more embodiments of the invention, the contact information may be retrieved from an inmate's mobile computing device (e.g., cell phone, smart phone, etc.) or a local or remote data storage device (e.g., a flash drive, a webmail account, etc.). The contact information may be retrieved using a wired or wireless connection between the booking kiosk and the inmate's mobile computing device and/or the data storage device. The contact information may be subject to review before the inmate is permitted to contact the visitor, outsider, administrator, or other inmate.

In one or more embodiments of the invention, the booking kiosk (204) includes functionality to prepare a mobile computing device for use by the inmate within the controlled facility (200). Specifically, a controlled facility (200) may allow inmates the use of computing devices while in or subject to the controlled facility (200). However, use of such inmate computing devices may require that the computing device is instrumented with software restricting the use of the inmate computing device. The booking kiosk (204) may be used to instrument the inmate computing device as required. Further detail about the booking kiosk (204) is provided in FIG. 5A and FIG. 5B.

In one or more embodiments of the invention, the administrator computing device (206) is a computing system or group of computing systems with functionality to execute the administrator application (218). In one or more embodiments of the invention, the administrator application (218) is a process or group of process with functionality to provide access to communications between inmates at the controlled facility (200) and visitors, outsiders, administrators, and other inmates. The administrator application (218) may also be used to monitor current voice or video calls between an inmate and a visitor, outsider, administrator, or other inmate.

In one or more embodiments of the invention, the administrator application (218) is used to manage an identity data item associated with an inmate. Such management may include altering the restrictions (device use restrictions, inmate use restrictions, and inmate target restrictions) applicable to the inmate. In one or more embodiments of the invention, the administrator application (218) is used to access the secure social network account of an inmate, visitor, or outsider. In one or more embodiments of the invention, the administrator application (218) may provide heightened access (i.e., a level of access greater than that of the inmate, visitor, or outsider) to data stored in the secure social networking account.

In one or more embodiments of the invention, the inmate kiosk (208) is a computing system with functionality to facilitate communication between an inmate and a visitor or outsider. Specifically, the inmate kiosk (208) may be a combination of computing hardware and software used by an inmate to make and receive voice and video calls to/from a visitor, outsider, or another inmate residing in another controlled facility (not shown). The inmate kiosk (208) may also be used to schedule a voice or video call with a visitor at a future date. Initiating or scheduling a voice or video call may include determining whether the currently attempted call or the scheduled call are adverse to one or more restrictions (e.g., inmate use restrictions, device use restrictions, and/or inmate target restrictions). Further, the inmate kiosk (208) may also include the functionality to exchange media (e.g., photos, videos, and audio) with a visitor or outsider. The inmate kiosk (208) may include functionality to generate such media, such as a camera, microphone, keyboard, and software to record or otherwise create media to send to a visitor or outsider. Such media may be subject to review before being delivered.

In one or more embodiments of the invention, an inmate wanting to use an inmate kiosk (208) may be required to participate in an authentication process to verify the identity of the inmate. The authentication process may include providing verification data for comparison to verified data previously obtained from the inmate and stored in the inmate identity data item. The verified data may be a username and password combination and/or biometric information about the inmate.

In one or more embodiments of the invention, the inmate kiosk (208) includes functionality to access a secure social network. Specifically, the inmate kiosk (208) may be used by an inmate to manage a secure social network account. The inmate kiosk (208) may include functionality to generate such media, such as a camera, microphone, keyboard, and software to record or otherwise create media to send to a visitor or outsider. The inmate kiosk (208) may also be used by an inmate to upload digital media to the inmate's secure social network account or the account of another secure social network member. The inmate kiosk (208) may further be used to view digital media uploaded to the inmate's social network account or the account of another secure social network member. Uploaded media may be subject to review before posting.

In one or more embodiments of the invention, the inmate kiosk (208) includes functionality to manage a commissary account for the inmate. Specifically, an inmate may use an inmate kiosk (208) to view a transaction history of the commissary account and/or to apply commissary funds for goods and services consumed or enjoyed by the inmate. Further detail about the inmate kiosk (208) is provided in FIG. 5A and FIG. 5B.

In one or more embodiments of the invention, the inmate phone (210) is a device with functionality to send and receive audio communications between an inmate and an outsider or visitor. The inmate phone (210) may be implemented as handset connected to a telephone line. In one or more embodiments of the invention, all or part of the voice call may be conducted over a VoIP connection. In one or more embodiments of the invention, a single inmate phone (210) is utilized by multiple inmates.

In one or more embodiments of the invention, initiating or receiving a voice call using the inmate phone (210) requires a form of authentication (e.g., providing a password, personal identification number, or voice verification). In one or more embodiments of the invention, voice calls made using the inmate phone (210) are monitored by one or more administrators using the administrator computing device (206), and are recorded and stored in a data storage system within the controlled facility (200), within the outside facility (not shown), or within a third party provider (not shown). The inmate phone (210) may also be subject to device use restrictions limiting the ability to use the inmate phone (210) at certain times (e.g., between 9 PM and 8 AM) or under certain conditions (e.g., emergency lockdown).

In one or more embodiments of the invention, the identity of the visitor or outsider targeted by the inmate or attempting to contact the inmate using the inmate phone (210) is verified against inmate target restrictions imposed on the inmate. Such restrictions may be associated with the inmate's identity data item and may be stored locally within the controlled facility (200), within the outside facility (not shown), or within a third party provider (not shown). The visitor or outsider identity may be verified by the local server (214) or by another server within the outside facility (not shown), or within a third party provider (not shown).

In one or more embodiments of the invention, the inmate computing device (212) is a computing system configured to execute the inmate application (202). In one or more embodiments of the invention, each inmate computing device (212) is utilized exclusively by a single inmate. In one or more embodiments of the invention, access to the inmate application requires a form of initial authentication. This initial authentication may use verification data stored locally on the inmate computing device (212) (e.g., a code or combination used to unlock the phone, locally stored biometric data, etc.).

In one or more embodiments of the invention, accessing a communications network (e.g., communications network (216)) using the inmate application (220) may require further network-based authentication. This further authentication may use verification data stored external to the inmate computing device (212) but locally within the controlled facility (200), or remotely within the outside facility (not shown) or within a third party provider (not shown).

In one or more embodiments of the invention, an authenticated inmate may use the inmate application to initiate or receive voice or video calls, initiate or receive text or media messages, schedule a voice or video call, manage a commissary account, or post media to a secure social network. In one or more embodiments of the invention, voice and video calls made using the inmate computing device (212) are monitored by one or more administrators using the administrator computing device (206), and are recorded and stored in a data storage system within the controlled facility (200), within the outside facility (not shown), or within a third party provider (not shown).

In one or more embodiments of the invention, the identity of the visitor or outsider targeted by the inmate or attempting to contact the inmate using the inmate computing device (212) is verified against inmate target restrictions imposed on the inmate. Such restrictions may be associated with the inmate's identity data item and may be stored locally within the controlled facility (200), within the outside facility (not shown), or within a third party provider (not shown). The visitor or outsider identity may be verified by the local server (214) or by another server within the outside facility (not shown), or within a third party provider (not shown).

In one or more embodiments of the invention, the inmate computing system (212) and/or the inmate application (220) may limit access to the communications network (216) based on one or more restrictions (inmate use restrictions, inmate target restrictions, and device use restrictions). Further, the inmate computing system (212) and/or the inmate application (220) may gather data from input devices of the inmate computing system (212) to determine whether one or more restrictions apply. Such input devices may include, for example, a system clock, a global positioning system antenna, a wide area network antenna, etc.

In one or more embodiments of the invention, the local server (214) is a computer system or group of computers systems located within the controlled facility (200) that facility communication between inmates and visitors, outsiders, and/or other inmates. Specifically, the local server (214) may implement the software necessary to host voice and video calls between and among the visitor kiosk (202), the inmate kiosk (208), the inmate phone (210), and an outsider computing system (not shown). The local server (214) may also include functionality to enforce communication restrictions associated with the inmates using the inmate kiosk (208) or inmate phone (210). Alternatively, the local server (214) may merely provide access to other systems capable of hosting the communication software and data storage (e.g., located within an offsite facility or a third party provider). Further, in one or more embodiments of the invention, the local server (214) includes functionality to regulate inmate access to a secure social network.

Figure 3:
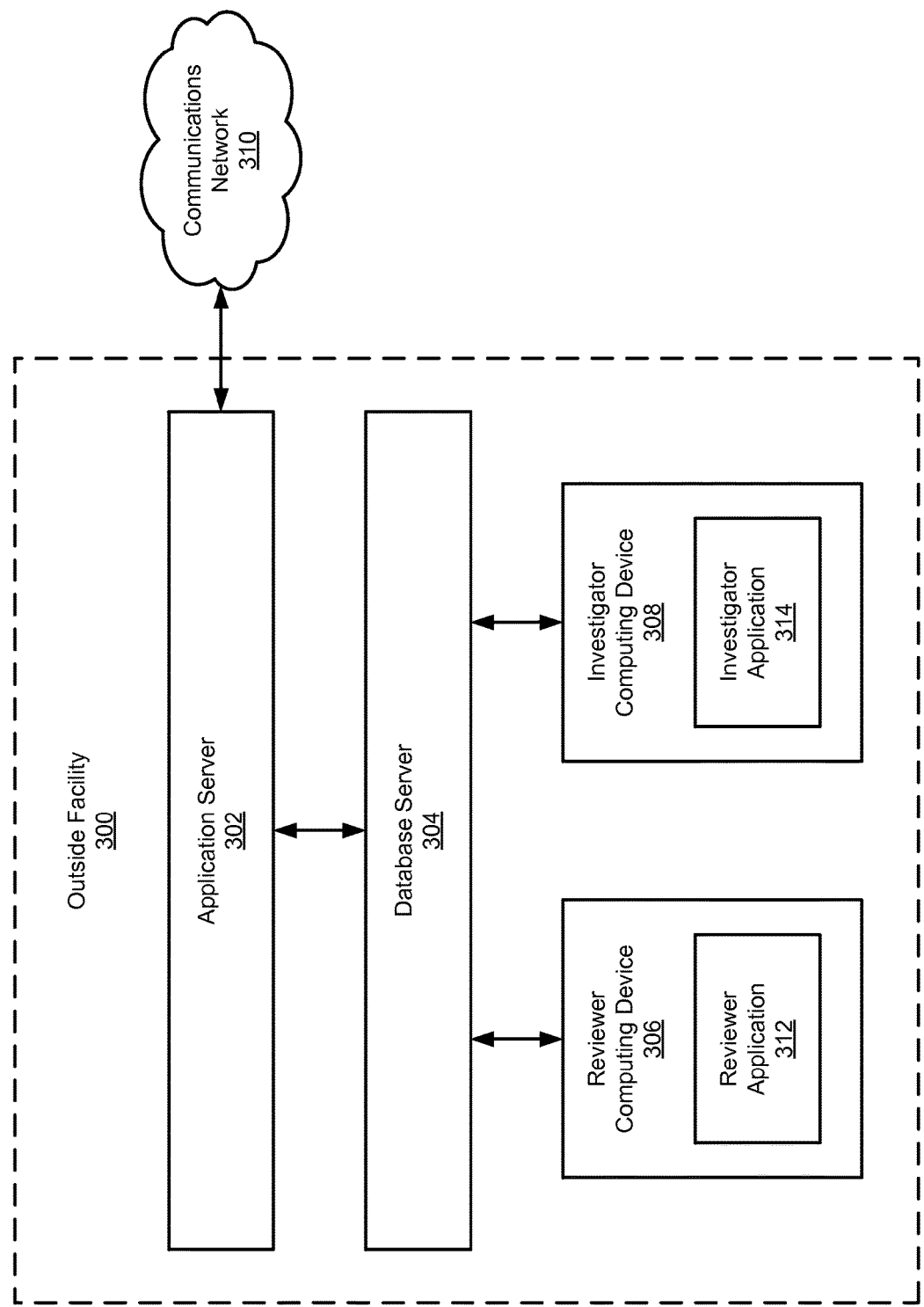
FIG. 3 shows a diagram of an outside facility in accordance with one or more embodiments of the invention.

FIG. 3 shows an outside facility in accordance with one or more embodiments of the invention. As shown in FIG. 3, the outside facility (300) may include an application server (302), a database server (304), a reviewer computing system (306), and an investigator computing system (308). The application server (302) is communicatively coupled to the communications network (310). The reviewer computing device (306) may include a reviewer application (312), and the investigator computing device (308) may include an investigator application (314).

In one or more embodiments of the invention, the application server (302) is a computing system or group of computing systems configured to authenticate inmates, visitors, outsiders, administrators, reviewers, and/or investigators. Specifically, the application server (302) includes functionality to receive a request to authenticate an inmate, visitor, outsider, administrator, reviewer, and/or an investigator, retrieve verified data associated with the request, and compare the verified data to verification data submitted in the authentication request. In one or more embodiments of the invention, the application server provides access to identity data items and other data stored in the database server (304).

In one or more embodiments of the invention, the database server (304) is a computing system or group of computing system configured to store data about inmates, visitors, outsiders, administrators, reviewers, and/or investigators as well as communication data describing communications between and among inmates, visitors, outsiders, administrators, reviewers, and/or investigators. Data stored in the database server may include, but is not limited to, identity data items, verified data, approved communication media, communication media pending review.

In one or more embodiments of the invention, the reviewer computing device (306) is a computing system configured to execute the reviewer application (312). In one or more embodiments of the invention, a reviewer is a person charged with viewing a media item submitted by an inmate, visitor, outsider or administrator, and determining one or more attributes of the media item. Based on the determined attributes of the media item, the reviewer may then approve the media item for transmission to its target inmate, visitor, or outsider. Alternatively, the reviewer may reject the media item, conditionally approve the media item, or redact parts of the media item, thus preventing complete transmission to its target inmate, visitor, or outsider. In one or more embodiments of the invention, the reviewer application (312) include functionality to view media items, associate one or more attributes to the media item, and/or mark the media items as approved or rejected.

In one or more embodiments of the invention, the investigator computing device (308) is a computing system configured to execute the investigator application (314). In one or more embodiments of the invention, an investigator is a person gathering information about an inmate, visitor, or outsider generally for the purposes of law enforcement. The investigator application (314) includes functionality to provide access to data stored on the database server (304) for investigative purposes.

Figure 4:
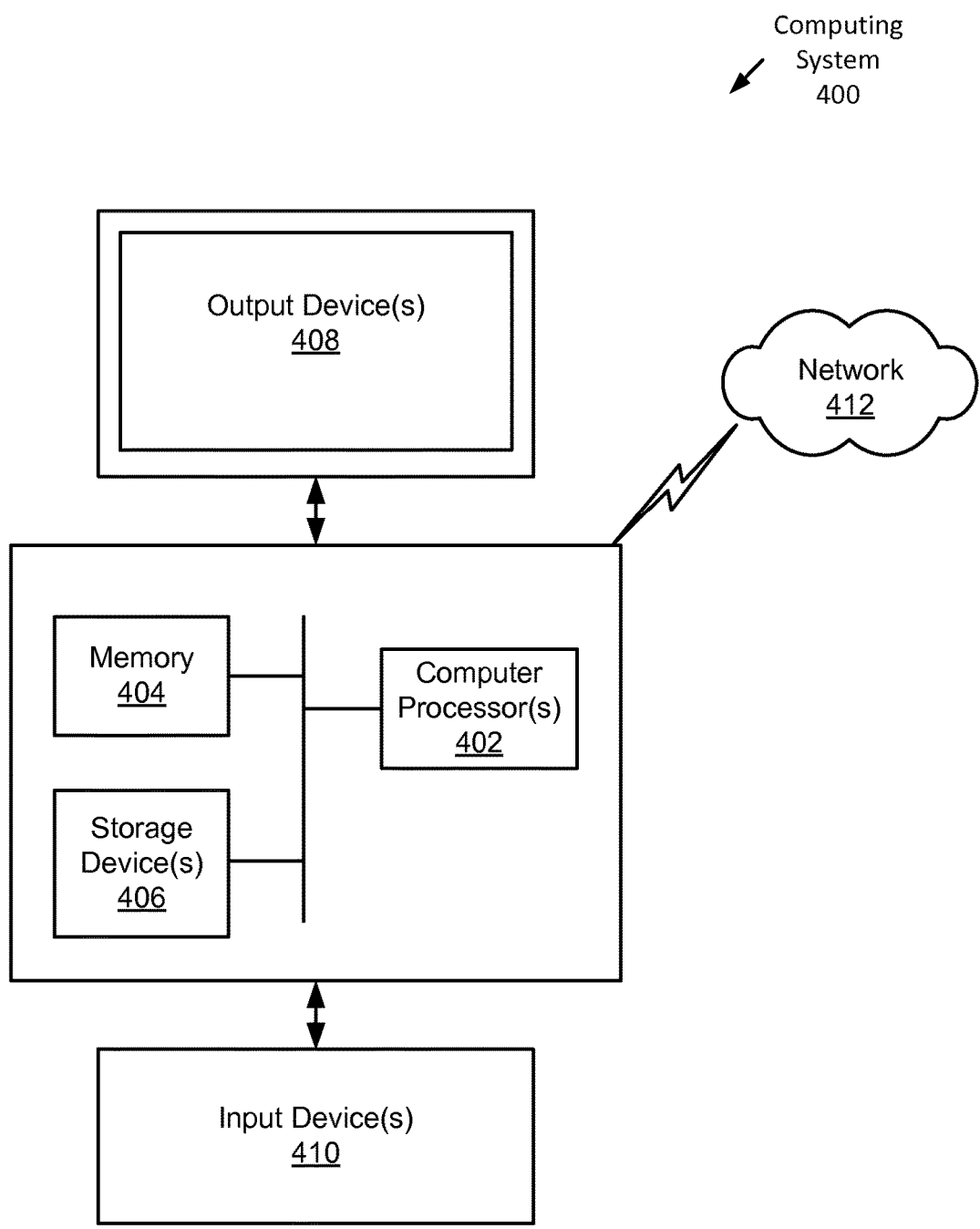
FIG. 4 shows a diagram of a computing system in accordance with one or more embodiments of the invention.

FIG. 4 shows a general computing system in accordance with one or more embodiments of the invention. As shown in FIG. 4, the computing system (400) may include one or more computer processor(s) (402), associated memory (404) (e.g., random access memory (RAM), cache memory, flash memory, etc.), one or more storage device(s) (406) (e.g., a hard disk, an optical drive such as a compact disk (CD) drive or digital versatile disk (DVD) drive, a flash memory stick, etc.), and numerous other elements and functionalities. The computer processor(s) (402) may be an integrated circuit for processing instructions. For example, the computer processor(s) may be one or more cores, or micro-cores of a processor. The computing system (400) may also include one or more input device(s) (410), such as a touchscreen, keyboard, mouse, microphone, touchpad, electronic pen, camera, or any other type of input device. Further, the computing system (400) may include one or more output device(s) (408), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (400) may be connected to a network (414) (e.g., a local area network (LAN), a wide area network (WAN) such as the Internet, mobile network, or any other type of network) via a network interface connection (not shown). The input and output device(s) may be locally or remotely (e.g., via the network (412)) connected to the computer processor(s) (402), memory (404), and storage device(s) (406). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (400) may be located at a remote location and connected to the other elements over a network (414). Further, embodiments of the invention may be implemented on a distributed system having a plurality of nodes, where each portion of the invention may be located on a different node within the distributed system. In one or more embodiments of the invention, the node corresponds to a distinct computing device. Alternatively, the node may correspond to a computer processor with associated physical memory. The node may alternatively correspond to a computer processor or micro-core of a computer processor with shared memory and/or resources.

Figure 5A:
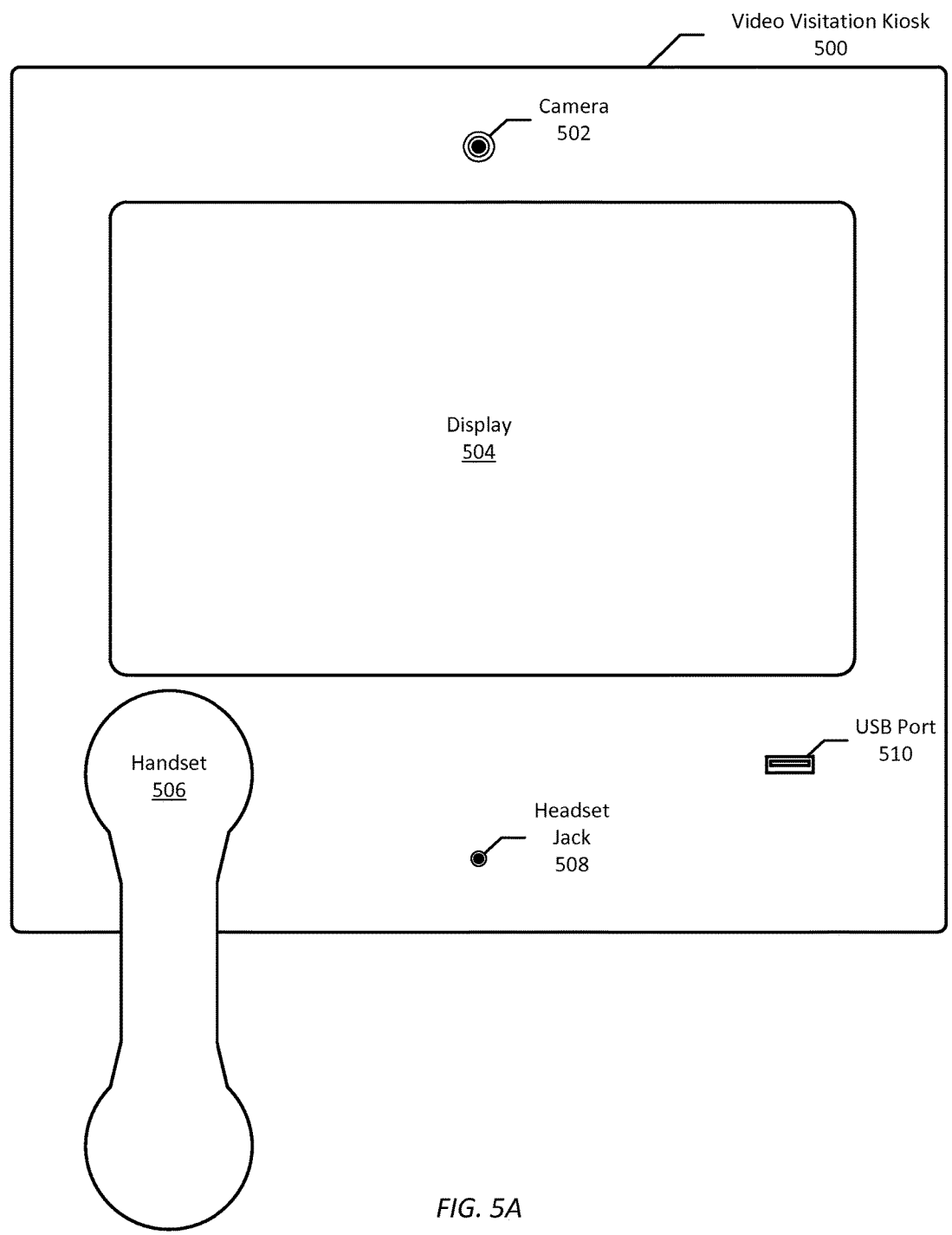
FIGS. 5A-5B show diagrams of a video visitation terminal in accordance with one or more embodiments of the invention.

FIG. 5A shows a video visitation kiosk in accordance with one or more embodiments of the invention. Specifically, the video visitation kiosk (500) is a type of computing device as described in FIG. 4. As shown in FIG. 5A, the video visitation kiosk (500) includes a camera (502), a display (504), a handset (506), a headset jack (508), and a universal serial bus (USB) port (510).

Figure 5B:
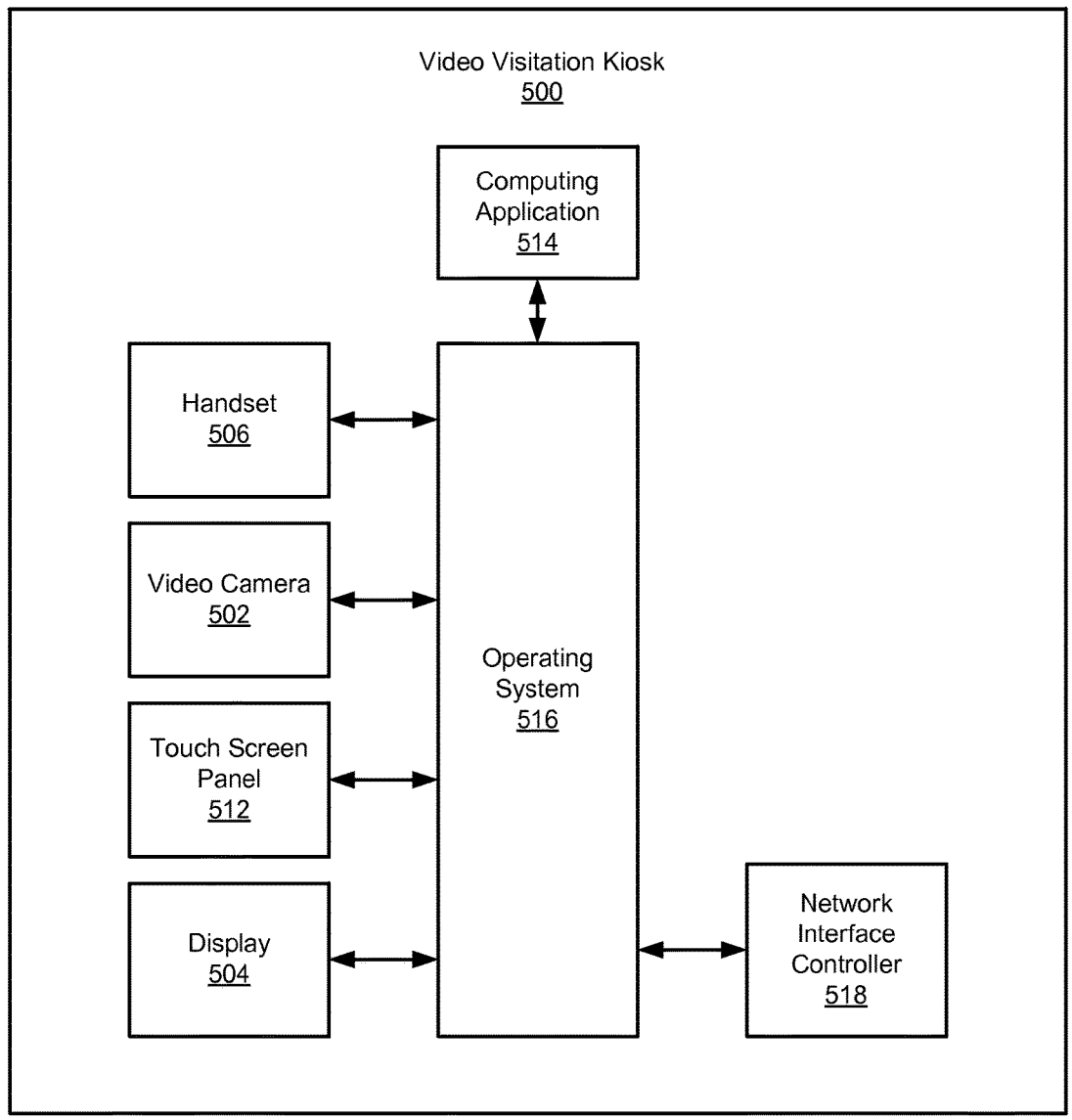

FIG. 5B shows the hardware and software elements of a video visitation kiosk in accordance with one or more embodiments of the invention. The hardware and software elements shown in FIG. 5B may be in addition to the elements described in FIG. 4. As shown in FIG. 5B, the video visitation kiosk (500) includes a handset (506), a video camera (502), a touch screen panel (512), a display (504), a computing application (514), an operating system (516), and a network interface controller (518).

Figure 6:
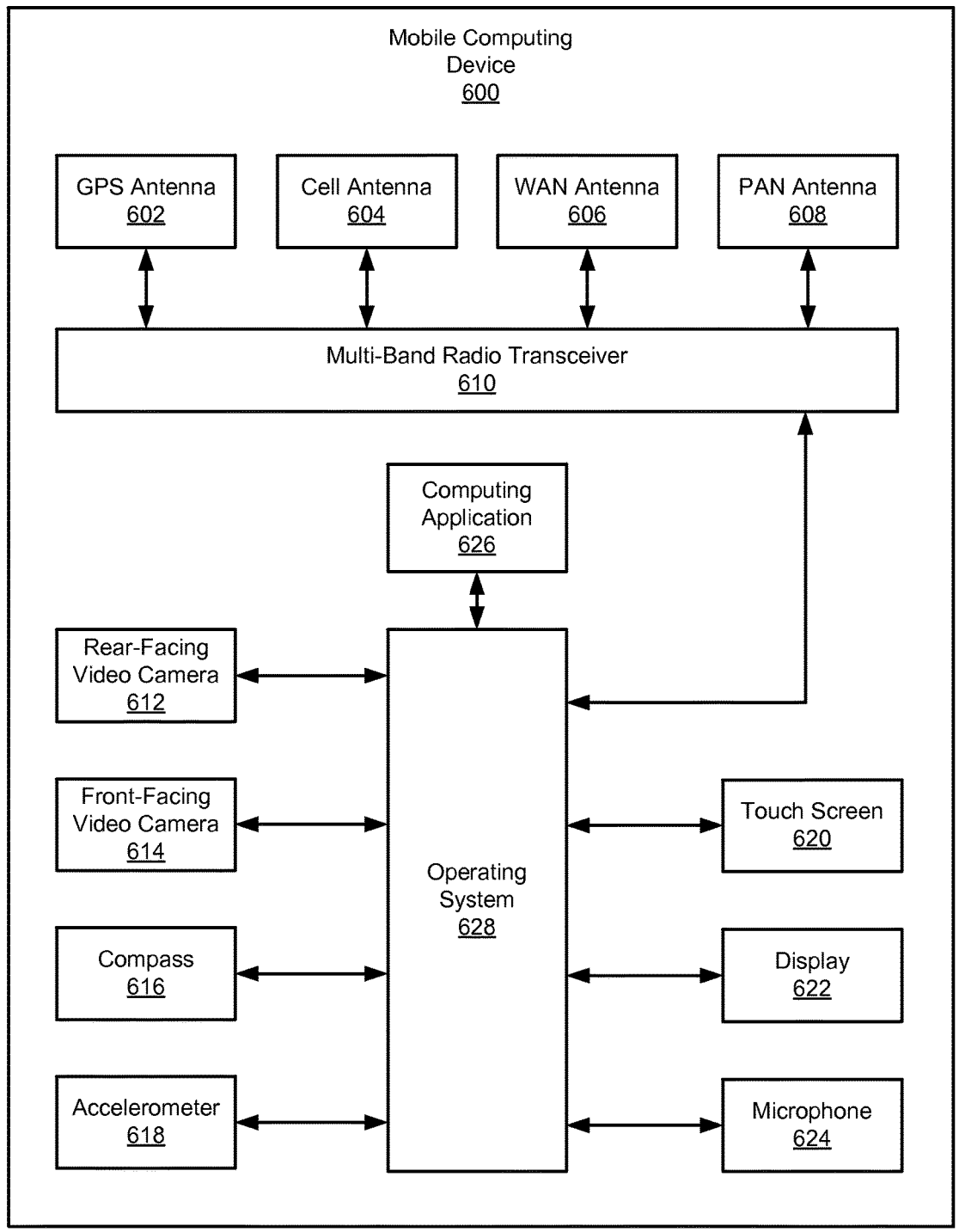
FIG. 6 shows a diagram of a mobile computing device in accordance with one or more embodiments of the invention.

FIG. 6 shows the hardware and software elements of a mobile computing device in accordance with one or more embodiments of the invention. Specifically, the mobile computing device (600) is a type of computing device as described in FIG. 4. The hardware and software elements shown in FIG. 6 may be in addition to the elements described in FIG. 4.

As shown in FIG. 6, the mobile computing device (600) may include a global positioning system (GPS) antenna (602), a cell antenna (604), a wide area network (WAN) antenna (606), and a personal area network (PAN) antenna (608), each connected to a multi-band radio transceiver (610). The mobile computing device (600) also may include a rear-facing video camera (612), a front-facing video camera (614), a compass (616), an accelerometer (618), a touch screen (620), a display (622), and a microphone (624). The mobile computing device (600) also may include a computing application (626) executing on an operating system (628).

Figure 7:
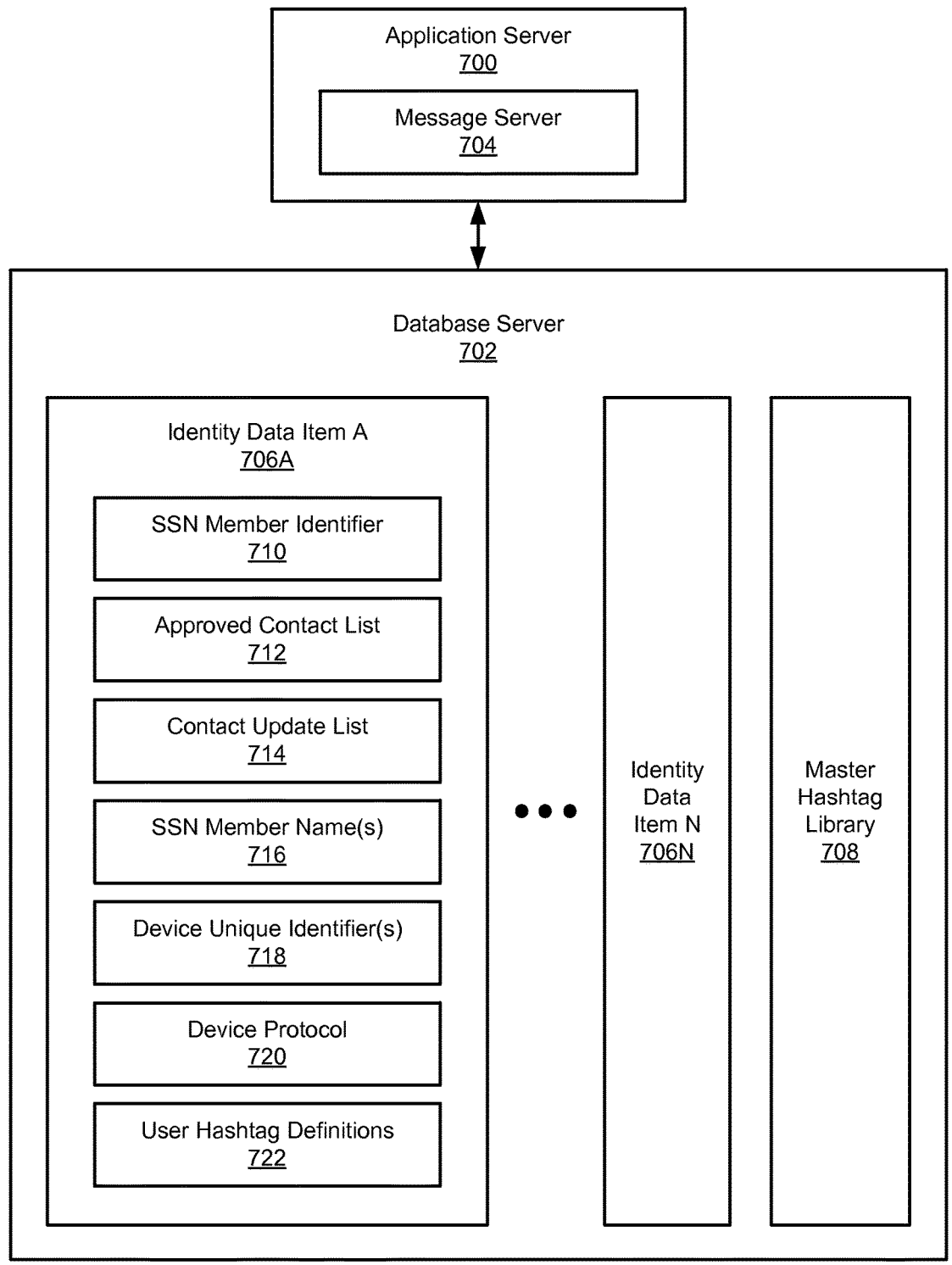
FIG. 7 shows a diagram of a database server in accordance with one or more embodiments of the invention.

FIG. 7 shows a system in accordance with one or more embodiments of the invention. The system shown in FIG. 7 shows additional elements to those shown in FIG. 3. As shown in FIG. 7, the application server (700) is communicatively coupled to a database server (702). The application server (700) may include a message server (704). The database server (702) may include multiple identity data items (identity data item A (706A), identity data item N (706N)) and a master hashtag library (708). Each identity data item (identity data item A (706A), identity data item N (706N)) may include an secure social network (SSN) member identifier (710), an approved contact list (712), a contact update list (714), an SSN member name(s) (716), a device unique identifier(s) (718), a device protocol(s) (720), and user hashtag definitions (722).

In one embodiment of the invention, the application server (700) and the database server (702) are components of a SSN. In one embodiment of the invention, a SSN is a network SSN member. Access to the SSN may require authentication of the user (e.g., inmate, visitor, or outsider) in a manner described above.

In one or more embodiments of the invention, each SSN member is associated with an identity data item (identity data item A (706A), identity data item N (706N)). In one embodiment of the invention, the identity data items (identity data item A (706A), identity data item N (706N)) are data structures with functionality to store information about a SSN member (e.g., inmates, visitors, and outsiders). In one embodiment of the invention, the identity data items (identity data item A (716A), identity data item N (716N)) include elements not shown in FIG. 7 (e.g., authentication data, unique identifiers, etc.).

In one or more embodiments of the invention, the SSN member identifier (710) is a data item that contains a unique identifier used to distinguish one SSN member from another SSN on the SSN network. The SSN member identifier (710) may be an alphanumeric string selected by the SSN member (e.g., screen name, email address, user handle, etc.) or assigned by the SSN (e.g., randomly assigned character string, etc.).

In one or more embodiments of the invention, the approved contact list (712) is a data item that contains SSN member identifiers (e.g., SSN member identifier (710)) of SSN member contacts of the SSN member. In one embodiment of the invention, each SSN member is associated with one or more contacts (i.e., friends, followers, etc.). In one embodiment of the invention, a SSN member's contacts are other SSN members that have indicated a desire to be connected to that SSN member within the SSN. In one or more embodiments of the invention, the SSN includes SSN members that are inmates of a controlled facility and SSN members that are outsiders and/or visitors. Accordingly, in one embodiment of the invention, an SSN member's contacts may be subject to the approval of an administrator. Specifically, an SSN member who is an inmate or would like to be connected to an inmate through the SSN may send a request to connect to the SSN that is evaluated by an administrator. That administrator may allow or deny the request depending upon any restrictions applicable to the inmate. The SSN member identifiers (e.g., SSN member identifier (710)) of approved SSN member contacts are stored in the SSN member's approved contact list (712).

In one or more embodiments of the invention, a SSN member may only send messages to, and receive messages from, SSN members listed in that SSN member's approved contact list (712). Some SSN members may have elevated access (e.g., administrators, investigators, etc.) and may send to, and receive messages from, SSN members not listed in that SSN member's approved contact list (712). Further, SSN members with elevated access may have access to messages exchanged between non-contact SSN members.

In one or more embodiments of the invention, the message server (704) is a process or group of processes with functionality to send messages between members of a secure social network (SSN). Specifically, the message server (704) may include functionality to receive messages from one SSN member, and transmit the message to one or more other SSN members targeted by the message. In one embodiment of the invention, the message server (704) may determine a SSN member's ability to send messages to, and receive messages from, other SSN members. Specifically, a SSN member's ability to contact another SSN member may be dependent upon whether the target SSN member is listed in the source SSN member's approved contact list (712).

In one or more embodiments of the invention, messages may be generated in a variety of ways. For example, messages may include text, audio, image, or video captured or composed on an inmate computing device, inmate kiosk, visitor kiosk, or outsider computing device. The messages may include content imported from a third party provider, such as a photo hosting service or social network. The messages s may be uploaded from a local data storage device, such as a flash drive, to an inmate computing device, inmate kiosk, visitor kiosk, or outsider computing device. In one embodiment of the invention, the inmate application, inmate kiosk, visitor kiosk, or outsider application includes software with functionality to generate messages. Each message may include a sender SSN member, one or more recipient SSN members, and message content. In one or more embodiments of the invention, messages include notifications. In one embodiment of the invention, a notification is a type of message automatically generated by the message server in response to an interaction between an SSN member and the SSN.

In one or more embodiments of the invention, messages may be generated using an inmate phone. Specifically, a message may include text content transcribed from audio given to the application server (700) using an inmate phone, computing device, or a device attached to a POTS. In one or more embodiments of the invention, messages may be generated using conventional mobile phone, commonly referred to as a cell phone, and owned or used by an outsider. In one or more embodiments of the invention, messages may be generated using a mobile phone with wireless data and an embedded programmable computer, commonly referred to as a smartphone, and owned or used by an outsider. In one embodiment of the invention, software on the inmate computing device, inmate kiosk, visitor kiosk, or outsider computing device may have the functionality to create messages in specific formats or specially configured for ease of exchange over the SSN. Such specially configured messages may be referred to as holler messages. For example, the holler software on the inmate computing device, inmate kiosk, visitor kiosk, or outsider computing device may be used to create a 12 second video or audio clip of the sender. As another example, the sender may compile a set of six digital photos to send to a SSN member contact. The holler software may limit the audio, video, or photographs based on the sender's selection of the holler format. For example, the holler software may allow no more than 12 seconds of video to be created for a message. In the event that the sender creates a video longer than 12 seconds, the software may only send the last 12 seconds of the recorded video. The limitations imposed on the holler format may be based on an efficient use of one or more device protocols (e.g., a media messaging system may accept video no longer than 12 seconds for a recommended quality).

In one or more embodiments of the invention, messages all messages sent across the SSN are directed to the message server (704). Specifically, all messages may be received by the message server (704) before being delivered by the message server (704) to the intended recipients. Accordingly, each message is generated with the same addressee, regardless of the intended SSN member recipient. In one or more embodiments of the invention, each message has two addressees: the system addressee refers to the message server handling the message routing. The system address may be a phone number that an SSN member uses to send messages to one or more inmates. Each message may have a recipient (also referred to as a target or address) that instructs the message server (706) regarding to which SSN member the message is to be routed. Consequently, each message may include both a system address and a recipient (indicated using a SSN member identifier or SSN member name).

In one or more embodiments of the invention, the contact update list (714) is a data item that contains one or more of the SSN members stored in the approved contacts list (712) who have indicated a desire to be notified of the SSN member's activities. Specifically, each SSN member may be given the option of receiving a notification in the event that one of their SSN member contacts interacts with the SSN. In one embodiment of the invention, an SSN member may select a subset of their approved contacts about whom to receive notifications. Further, an SSN member may select the type of interaction that triggers the notification. For example, an SSN member who is an inmate may indicate a desire to be notified when her husband, who is a SSN member and an outsider, posts a new picture to the SSN. In one embodiment of the invention, in the event that the application server (700) detects that a SSN member has engaged in an activity that one or more of that SSN member's contacts have indicated a desire to be notified about, the application server (700) may then send a notification of the activity to the SSN member contacts listed in the SSN member's contact update list (714). In one embodiment of the invention, a notification is a type of message.

In one or more embodiments of the invention, the SSN member name(s) (716) is a data item that contains non-unique identifiers for the SSN member contact. Such non-unique identifiers may include the SSN member contact's full legal name, one or more variations of their full legal name, one or more nicknames, one or more chosen or assigned usernames, etc. For example, an SSN member contact named John Smith may have John, jsmith, smithy, johnny, beatboy, and zebrahead included in his SSN member name(s) (716). In one embodiment of the invention, different SSN member name(s) (716) for different SSN members may include identical non-unique identifiers. For example, more than one SSN member contact may have "John" listed in their SSN member name(s) (716).

In one or more embodiments of the invention, the device unique identifier(s) (718) is a data item that contains a set of characters used to uniquely identify the SSN member's device. In one embodiment of the invention, the device is a computing device (e.g., a smart phone) or a non-computing device (e.g., a handset attached to a POTS). In one embodiment of the invention, the device unique identifier(s) (718) includes a unique identifier for each device that the SSN member has verified with the system for the purpose of receiving SSN notifications and messages. Such unique identifiers may include phone numbers, email addresses, usernames, or any other set of characters that distinguish one message destination from another. In one embodiment of the invention, no two device unique identifier(s) (718) for different SSN members include identical identifiers.

In one or more embodiments of the invention, the device protocol (718) is a data item that contains the protocols supported by the device(s) associated with the device unique identifier(s) (718). Specifically, the device protocol (718) lists the type of notifications and messages that the device is capable of receiving. For example, the device protocol (718) may indicate that the device corresponding to the phone number "(234)-567-8900" is capable of receiving short message service (SMS) messages, enhanced messaging service (EMS) messages, and multimedia messaging service (MMS) messages.

In one or more embodiments of the invention, the master hashtag library (708) is a repository containing associations between hashtags and hashtag definitions. In one embodiment of the invention, a hashtag is a combination of a hashmark ("#") and one or more non-space characters. In one or more embodiments of the invention, a hashtag may be used to provide information (e.g., metadata) about a message. For example, the hashtag #foodopinion may be attached to the message "I like pizza". In one embodiment of the invention, multiple hashtags may be used for a single message. For example, the message "I just read Tom Sawyer. It was wonderful!" may include the hashtags #bookreview and #marktwain. In one embodiment of the invention, one or more hashtags are attached inline to the message text.

Using the above example, a complete message may read "I just read Tom Sawyer. It was wonderful! #bookreview #marktwain".

In one or more embodiments of the invention, a hashtag may have more than one intended definition. Specifically, a single hashtag may be used by one SSN member to mean one thing, and the same hashtag may be used by another SSN member to mean a different thing. For example, one SSN member may use the hashtag #PDA to mean "public display of affection", and another SSN member may use the same hashtag to mean "personal digital assistant". Further, depending on the intended definition of a hashtag, the overall effect of a message may be altered. For example, the message "I love this new smartphone too much! #PDA" may have different meanings depending on the recipient's understanding of the definition of the hashtag #PDA. In one or more embodiments of the invention, the master hashtag library (708) includes multiple hashtags and one or more definitions for each hashtag. Further detail about the user master hashtag library (708) is provided in FIG. 10.

In one or more embodiments of the invention, the user hashtag definitions (722) is a repository containing associations between hashtags and hashtag definitions selected by the SSN member associated with the identity data item (identity data item A (706A), identity data item N (706N)). Specifically, the user hashtag definitions (722) include hashtags used by the SSN member, and the definition for each hashtag that the SSN member has selected. In one embodiment of the invention, recording a SSN member's user hashtag definitions (722) may aid investigators or administrators in interpreting messages exchanged between inmates, outsiders, and visitors. Further detail about the user hashtag definitions (722) is provided in FIG. 10.

Figure 8:
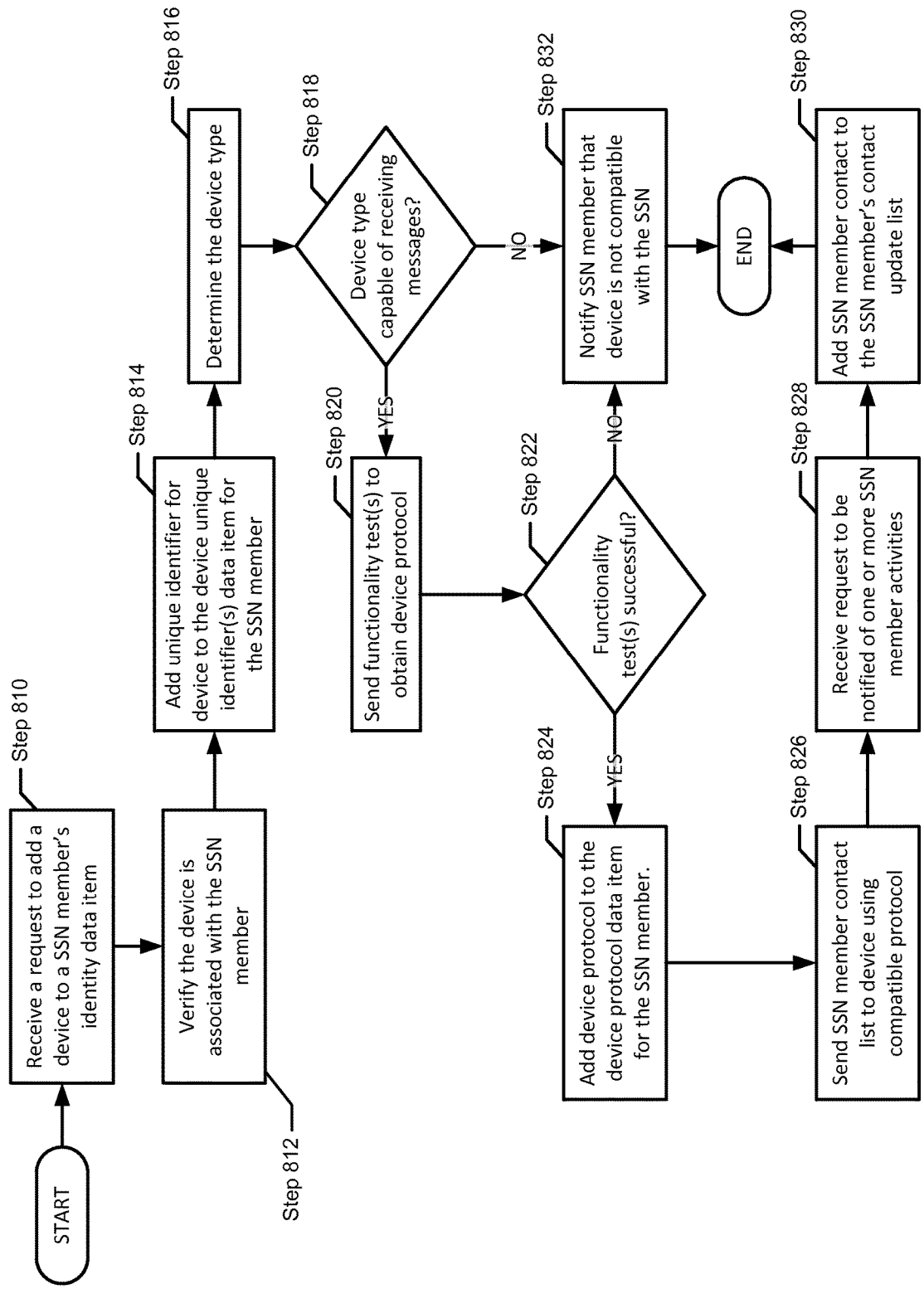
FIG. 8 shows a flow diagram in accordance with one or more embodiments of the invention.

FIG. 8 shows a flowchart for adding a device to an identity user data item in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel.

In Step 810, the message server receives a request to add a device to a SSN member's identity data item. In one embodiment of the invention, the request is received only after the SSN member has been authenticated. In one embodiment of the invention, the request includes a device unique identifier. In Step 812, the message server verifies that the devices associated with the SSN member. In one embodiment of the invention, verifying that the device is associated with the SSN member includes sending a code to the device using the device unique identifier, and requesting that the code be submitted by the SSN member attempting to verify the device. For example, the message server may send a text message to a mobile computing device and ask the SSN member to submit the content of the text message using a previously verified device.

In Step 814, once the device is verified as associated with the SSN member, the unique identifier for the device is added to the device unique identifier data item for the SSN member. In one embodiment of the invention, the device unique identifier is a telephone number. In Step 816, the message server determines the device type. In one or more embodiments of the invention, a device type refers to a category of the device. For example, a device type may be a landline phone, a mobile phone with limited text capabilities, a smart phone, a tablet, etc. In one embodiment of the invention, the device type is determined by querying a web database with the device unique identifier. For example, the message server may send a request including a phone number to a web database that correlates phone numbers to types of phones (landline, mobile, etc.).

In Step 818, the message server determines whether the device type is capable of receiving messages. In one embodiment of the invention, this determination is made based on a correlation known by the message server between device types and message capabilities. If in Step 818, the device type is capable of receiving messages then in Step 820, the message server sends a functionality test to obtain the device protocols. Such functionality tests may include, for example, a wireless application protocol push for device discovery, an MMS message with a click-to-web link, an MMS delivery receipt, etc. In one embodiment of the invention, the message server may send one or more messages using the most robust device protocol the message server utilizes. For example, the message server may send three MMS messages each containing a picture to the device. Each picture may be an image of an instruction to respond to the MMS message. Based on the responses received, the message server can derive the capabilities of the device. In one embodiment of the invention, if no response is received using the most robust protocol, a lesser protocol may then be used as a further test.

As a non-limiting example of a functionality test, the message server may use a three-part message test to determine the functionality of the device as follows: First, the message server sends an MMS protocol message containing three images, with the second image containing identifying information, such as a number or text string. The recipient is instructed to reply with the information in the second image. In the event that the device does not support the MMS protocol, none of the images will be viewable on the device. In the event that the device supports a limited version of the MMS protocol, it is likely that only the first or third picture will be viewable on the device. In either case, the recipient will be unable to read the identifying information, and therefore will be unable to demonstrate full MMS protocol support. A response from the recipient that includes the identifying information demonstrates to the message server that the device is fully compatible with the MMS protocol.

In the event that the first test indicates that the device is incompatible with the full MMS protocol, a second test is employed to determine compatibility with the EMS protocol. The second test may include sending a vCard entry for the message service or a calendar entry (e.g. iCalendar entry) that specifies a future alarm. The second test may also includes sending a message longer than 160 characters designed such that the verification string will be unreadable using the SMS protocol but viewable using the EMS protocol. Such an EMS message may be split across multiple messages or dropped completely if the SMS protocol is used. A response based on an incomplete code indicates that the device does not support the EMS protocol.

Finally, in the event that the first two tests fail, an SMS message is sent requesting a verification reply. If no reply is received, the device is assumed to not support the SMS protocol.

In Step 822, the message server determines whether the functionality test was successful. In one or more vitamins of the invention, the functionality test is successful upon the message server receiving a response to one of the functionality tests. If in Step 822, the functionality test was successful, then in Step 824, the device protocol obtained from the functionality test is added to the device protocol data item for the SSN member.

In Step 826, the message server sends the SSN member's contact list to the device using a compatible protocol. In one or more embodiments of the invention, in the event that the device supports the MMS protocol, the message server sends a list of all SSN member contacts as an MMS message with a profile photo and the contact's name as an image caption. The message may include a request that the SSN member indicate whether or not they want to receive updates from each inmate presented.

In one or more embodiments of the invention, if the device does not support the MMS protocol, then the SSN member is presented with an SMS message that contains a text list of the SSN member contacts. The list may contain each contact's full name, booking date, birthdate, calculated age based on their birthdate, or any other information necessary to ensure the correct and/or desired SSN member contact is being selected. Each contact listing may be preceded with a unique numeric or letter sequence, allowing the SSN member to specify which contacts to add to the SMS communications service. The SSN member may reply with one or more of the unique sequences, and the corresponding contacts will be added to their contact update list. In one embodiment of the invention, the SSN member may reply with a message indicating that all of the SSN member's contacts should be added to the contact update list.

In one embodiment of the invention, the SSN member's contact list is sent to the device with a request that the user select which of the SSN member's contacts about whom the SSN member wishes to receive notifications. In Step 828, the message server receives a request from the SSN member to be notified of one or more other SSN member's activities. In Step 830, the SSN member contacts selected by the SSN member are added to the SSN member's contact update list.

Figure 9:
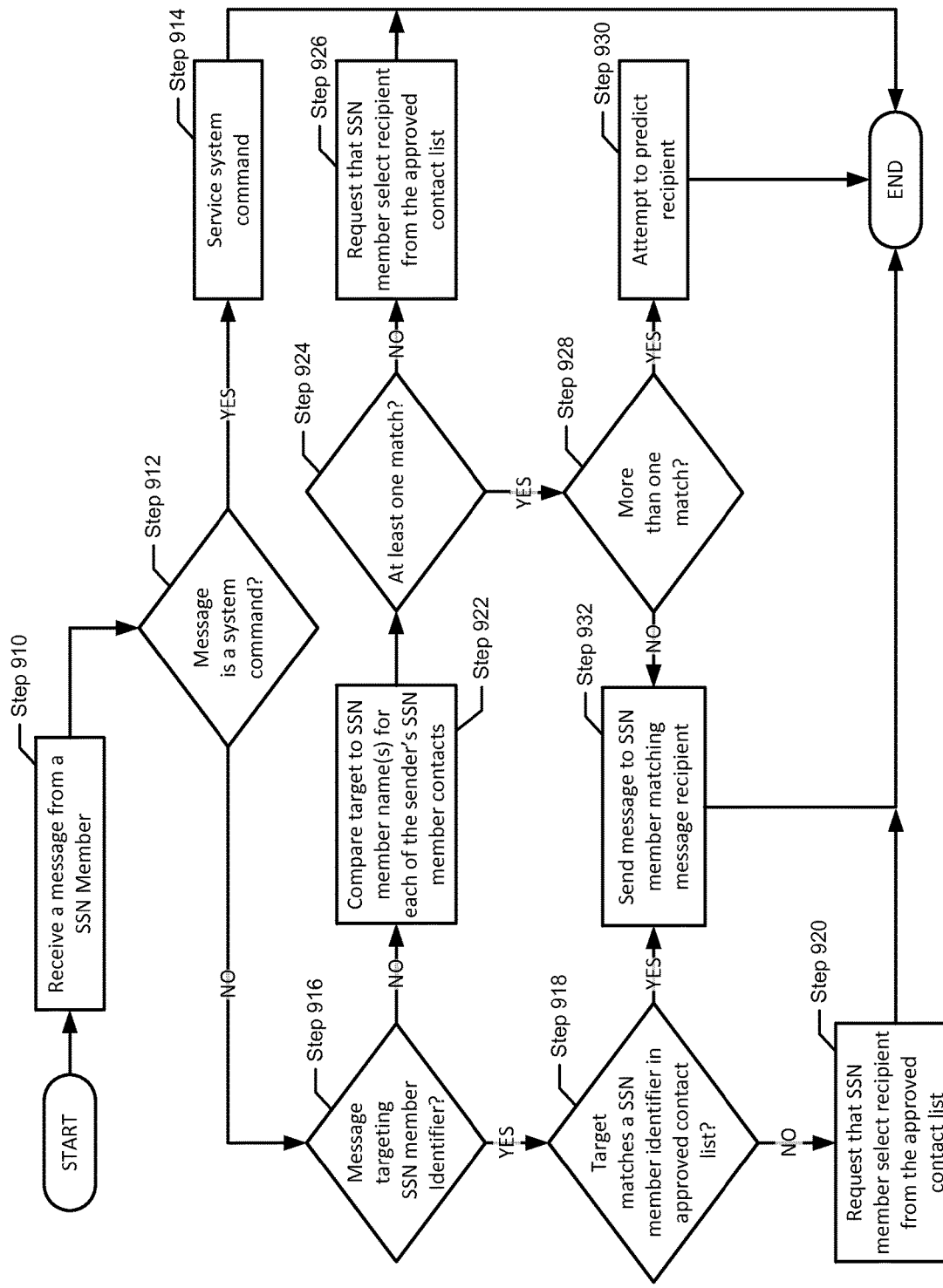
FIG. 9 shows a flow diagram in accordance with one or more embodiments of the invention.

If in Step 822, the functionality test is unsuccessful, or if in Step 818, the device type is not capable of receiving messages, and then in Step 832, the SSN member is notified that the device is not capable with the SSN. FIG. 9 shows a flowchart for sending a message to multiple recipients in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel.

FIG. 9 shows a flowchart for adding a device to an identity user data item in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel.

In Step 910, the message server receives a message from a SSN member. In Step 912, the message server determines whether the message is a system command. If in Step 912, the message server determines that the message is a service command, then in Step 914, the message server services the system command. In one or more moments of the invention, a SSN member may use the message server to perform account management. For example, the message server may accept system commands for adding funds to a commissary or communication account, blocking other SSN members from whom the user of the device wishes to no longer receive messages from or about, requesting help regarding using the SSN, requesting account status, and requesting progress reports regarding an inmate such as birthday, current location, etc.

If in Step 912, the message server determines that the message is not a system command then in Step 916 the message server determines whether the received message targets and SSN member identifier. In one or more embodiments of the invention, a message may be addressed using a variety of methods. In one embodiment of the invention, a message may be addressed using a SSN member identifier that uniquely identifies the target SSN member on the SSN. Alternatively, in one embodiment of the invention, a message may be addressed using a short form identifier (i.e., SSN member name), such as a nickname, a first name only, a variation of a name, etc. Each known short form identifier is stored in the SSN member name data item for the SSN member.

If in Step 916, the message server determines that the message does not target an SSN member identifier, then in Step 922, the message server compares the target to the SSN member names for each of the sender's SSN member contacts. In Step 924, the message server determines whether there is at least one match between the message address and the SSN member names of the SSN member's contacts. If in Step 924 there is not at least one match, then in Step 926, the message server sends a request to the SSN member to select a recipient from the approved contact list.

If in Step 924, the message server determines that there is at least one match between the address of the message and the SSN member names for the sender's SSN member contacts, then in Step 928, the message server determines whether there is more than one match. If in Step 928, there is more than one match between the address of the message and the SSN member names for the sender's SSN member contacts, then in Step 930, the message server attempts to predict the recipient. Further detail about Step 930 is provided in FIG. 10.

If in Step 916, the message server determines that the message does target an SSN member identifier, then in Step 922, the message server determines whether the target address matches a SSN member identifier in the senders approved contact list. If in Step 918, the message server determines that the address matches a SSN member identifier in the senders approved contact list, or if in Step 928, there is not more than one match between the address of the message and the SSN member names for the sender's SSN member contacts, then in Step 932, the message server sends the message to the SSN member matching the message recipient.

If in Step 918, the message server determines that the address does not match a SSN member identifier in the senders approved contact list, then in Step 920, the message server sends a request to the SSN member to select a recipient from the SSN members approved contact list.

Figure 10:
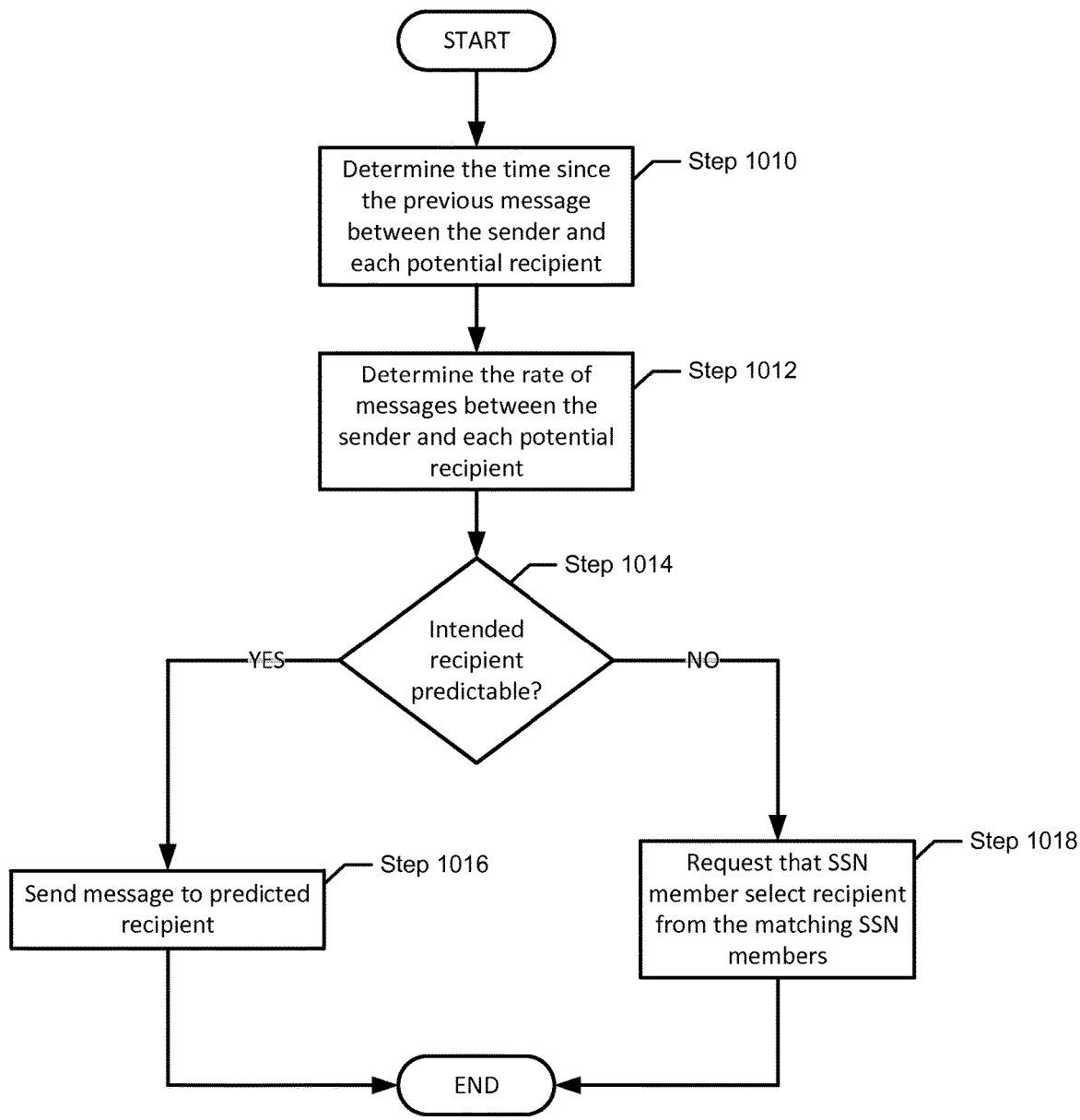
FIG. 10 shows a flow diagram in accordance with one or more embodiments of the invention.

FIG. 10 shows a flowchart for predicting a message recipient in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel.

In one embodiment of the invention, FIG. 10 shows an expansion of Step 930 in FIG. 9. In Step 1010, the message server determines the amount of time since the previous message between the sender and each potential recipient (i.e., each SSN member whose SSN member name matches the message address). In one embodiment of the invention, a match may not be an exact match but may be similar beyond an established threshold (e.g., within one or two character's difference). In Step 1012, the message server determines the rate of messages between the sender and each potential recipient. In one embodiment of the invention, the message server may gather additional or alternative metrics regarding the messages exchanged between the sender and other SSN members, such as other SSN members that have recently exchanged messages with the sender.

In Step 1014, the message server determines whether the intended recipient is predictable. In one embodiment of the invention, this determination uses the amount of time between messages exchanged with each matching SSN member name and the rate at which messages have recently been sent. For example, Mary, and SSN member connected to two inmates named John, may address a message as "~john". Further, "~john" may match both of the SSN member names for Mary's two contacts named John. In this example, the message server will determine the amount of time that has passed since the last message exchange that Mary has had with each of the Johns. It may be likely that Mary intended to continue a recent conversation with the first John, and has not exchanged messages with the second John recently. In this case, the message server may consider the intended recipient predictable. However, it may be the case that Mary last received a message from the second John which interrupted her conversation with the first John. In this case, the intended recipient may not be predictable.

If in Step 1014, the message server determines that the intended recipient is predictable, then in Step 1016, the message server sends the message to the predicted recipient. If in Step 1014, message server determines that the intended recipient is not predictable, than in Step 1018, the message server requests that the intended recipient from a list of SSN member contacts matching the SSN member name.

Figure 11:
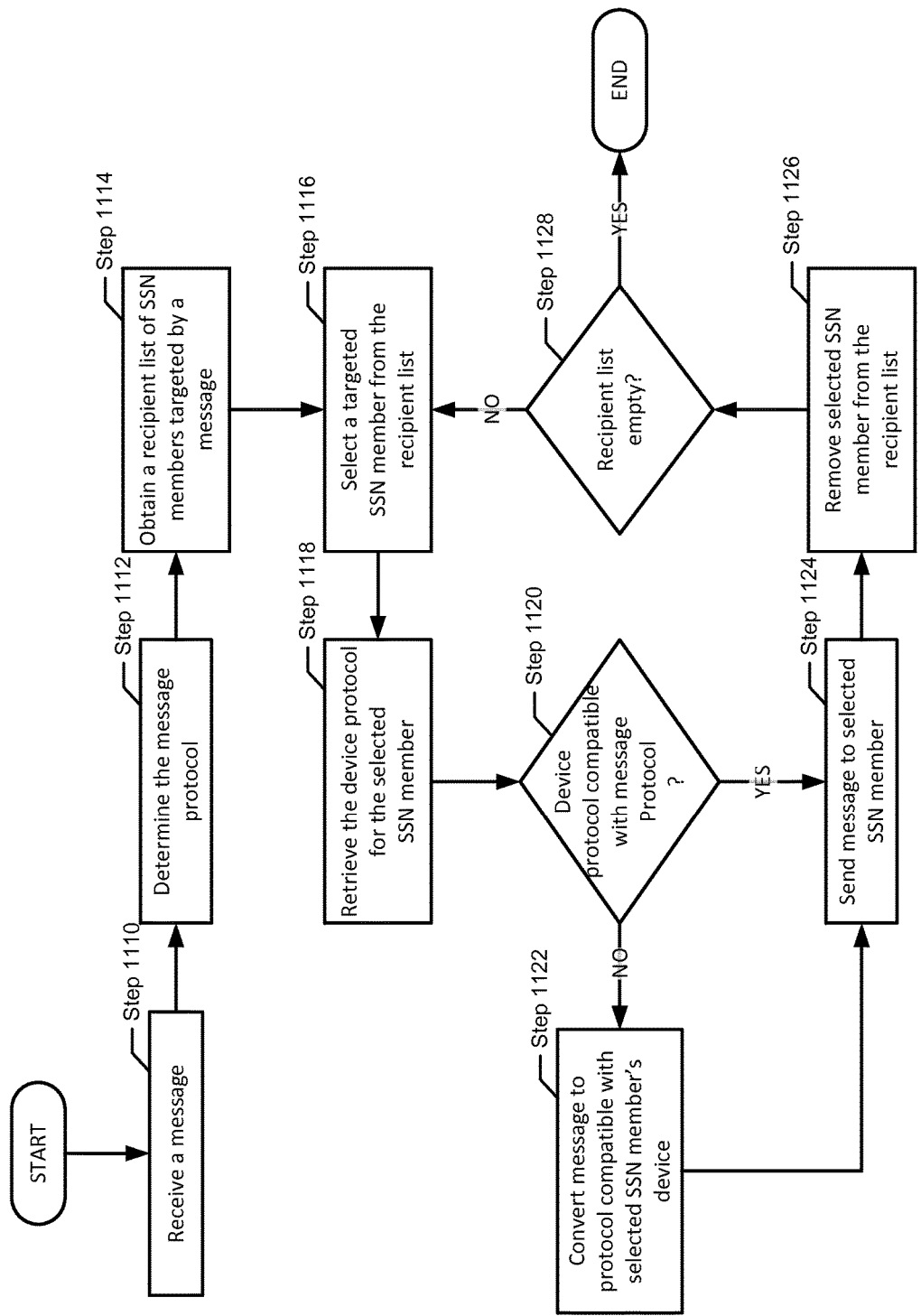
FIG. 11 shows a flow diagram in accordance with one or more embodiments of the invention.

FIG. 11 shows a flowchart for sending a message to multiple devices utilizing incompatible protocols in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel.

In Step 1110, the message server receives a message addressed to one or more recipients. In Step 1112, the message server determines the protocol used to create the message. In Step 1114, the message server obtains the list of recipients targeted by the message. In Step 1116, the message server selects one of the targeted SSN members from the recipient list. In Step 1118, the message server retrieves the device protocol stored in the identity data item for the selected SSN member. In Step 1120, the message server determines whether the device protocol is compatible with the message protocol. If in Step 1120, the message server determines that the device protocol is not compatible with the message protocol, then in Step 1122, the message server converts the message to a protocol compatible with the selected SSN member's device. In one or more embodiments of the invention, converting a message to a compatible protocol includes removing elements from the message that are incompatible with the device protocol (such as digital photos, video, etc.). For example, message composed using the MMS protocol may be sent to a recipient using a device that does not support MMS. In this case, the message server may convert at the MMS message to an SMS message. This conversion may include removing or replacing elements in the MMS message. For example, a picture included in an MMS message may be replaced by text indicating that a picture was removed.

If in Step 1120, the message server determines that the device protocol is compatible with the message protocol, then in Step 1124, the message is sent to the selected SSN member. In Step 11 twice 6, the selected SSN member is removed from the recipient list. In Step 1128, the message server determines whether the recipient list is currently empty. If in Step 1128, the message server determines that the recipient list is not empty, then the flow returns to Step 1116. If in Step 1128, the message server determines that the recipient list is empty, then the flow ends.

Figure 12:
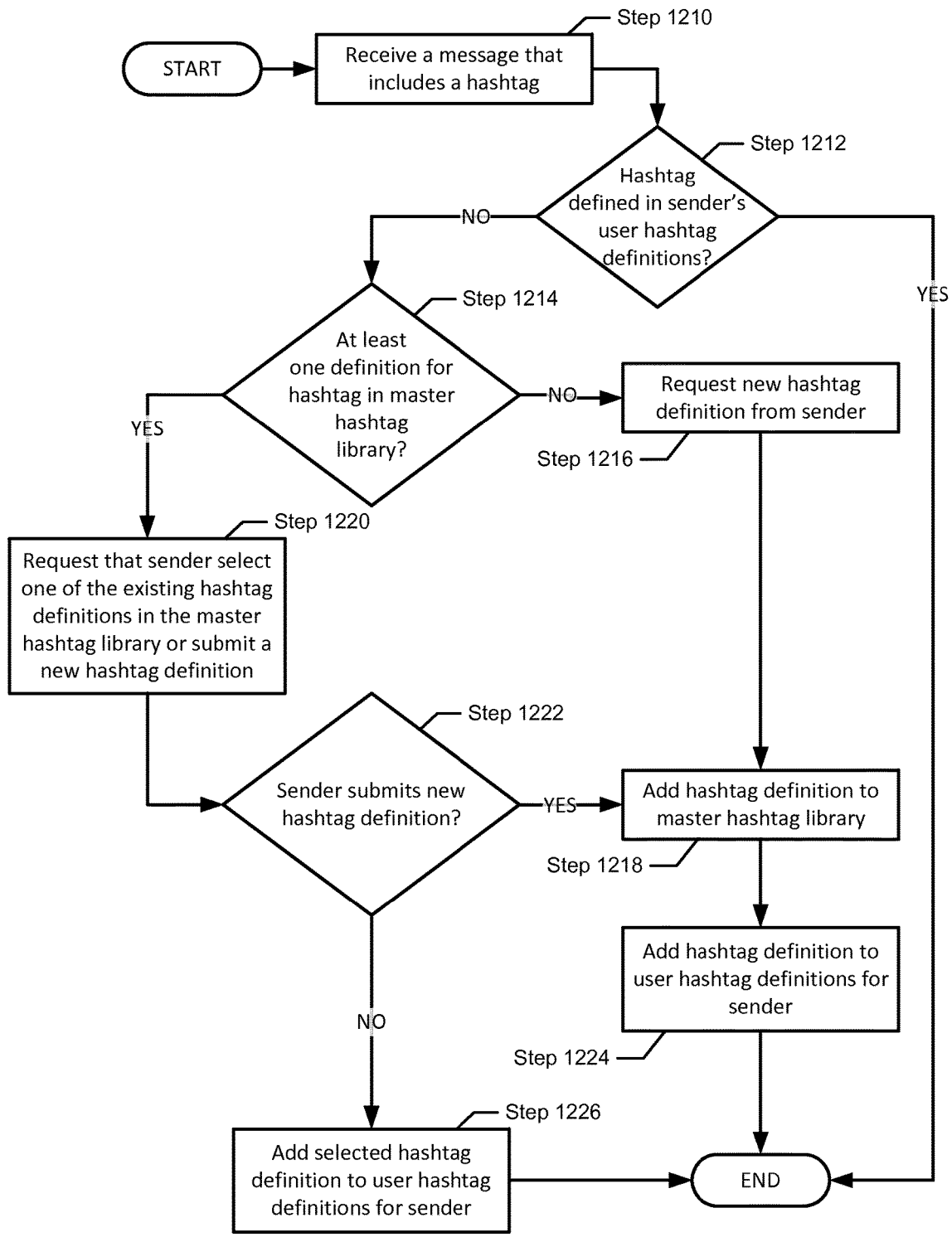
FIG. 12 shows a flow diagram in accordance with one or more embodiments of the invention.

FIG. 12 shows a flowchart for defining a hashtag in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel.

In Step 1210, the message server receives a message that includes a hashtag. In Step 1212, the message server determines whether the hashtag is defined in the sender's user hashtag definitions. If a Step 1212, the message server determines that the hashtag is defined in the sender's user hashtag definition, then the flow ends. If in Step 1212, the message server determines that the hashtag is not defined in the sender's user hashtag definitions, then in Step 1214, the message server determines whether at least one definition for the hashtag exists in the master hashtag library. If a Step 1214, the message server determines that there is not at least one definition for the hashtag in the master hashtag library then in Step 1216, the message server requests from the message sender a new hashtag definition. In Step 1218, the message server receives the new hashtag definition from the sender and adds the hashtag definition to the master hashtag library.

If in Step 1214, the message server determines that at least one definition for the hashtag exists in the master hashtag library, then in Step 1220, the message server request that the sender selects one of the existing hashtag definitions in the master hashtag library or submits a new hashtag definition. In Step 1222, the message server determines whether the sender has submitted a new hashtag definition. If in Step 1222, the sender has submitted a new hashtag definition, then in Step 1218, the new hashtag definition is added to the master hashtag library. In Step 1224, the hashtag definition is added to the user hashtag definitions for the sender. If in Step 1222, the message server determines that the sender has not submitted a new hashtag definition, but rather has selected an existing hashtag definition from the master hashtag library, then in Step 1226, the selected hashtag definition is added to the user's hashtag definitions for the sender.

Figure 13A:
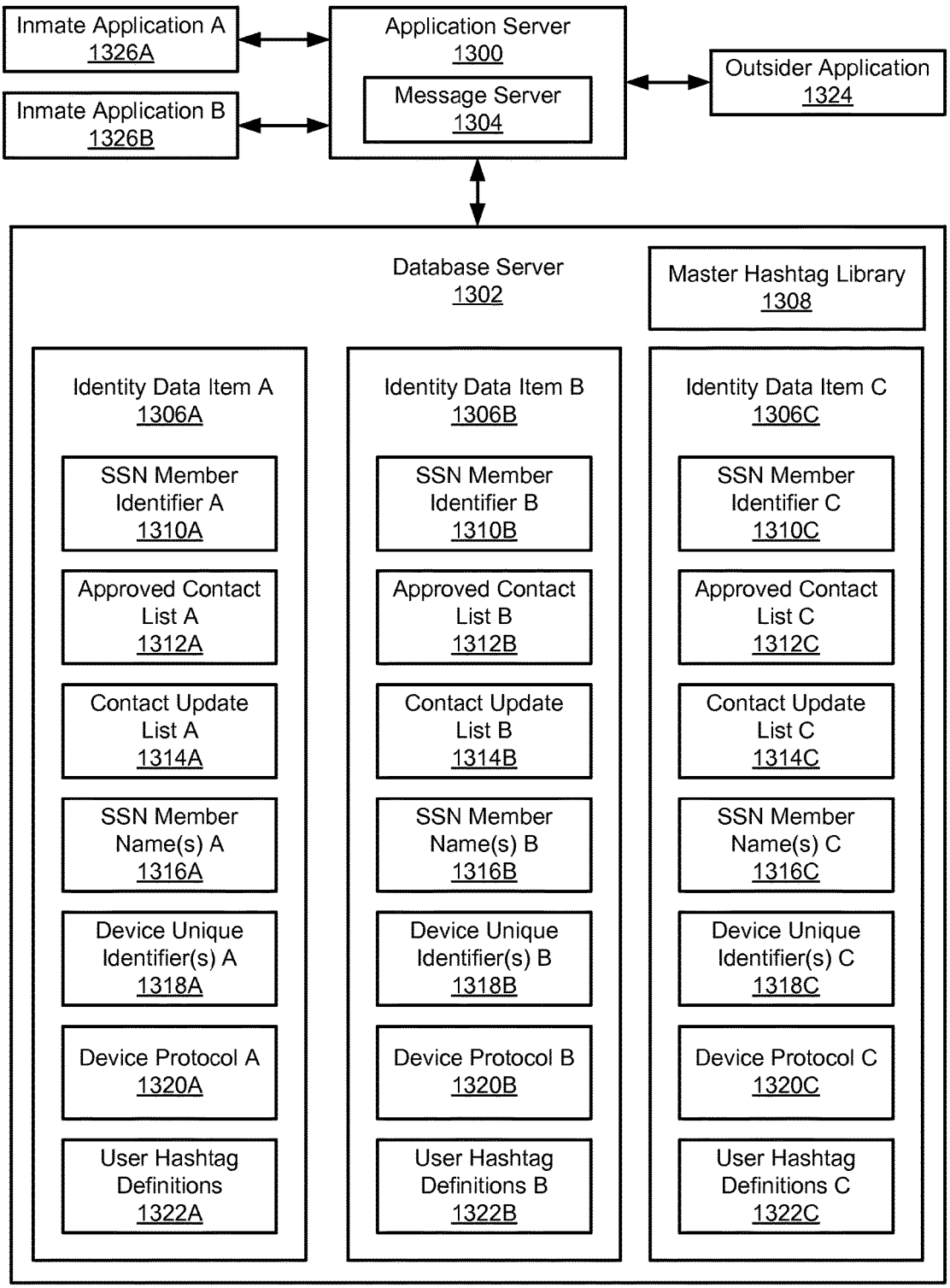
FIGS. 13A-13C show an example in accordance with one or more embodiments of the invention.
Figure 13B:
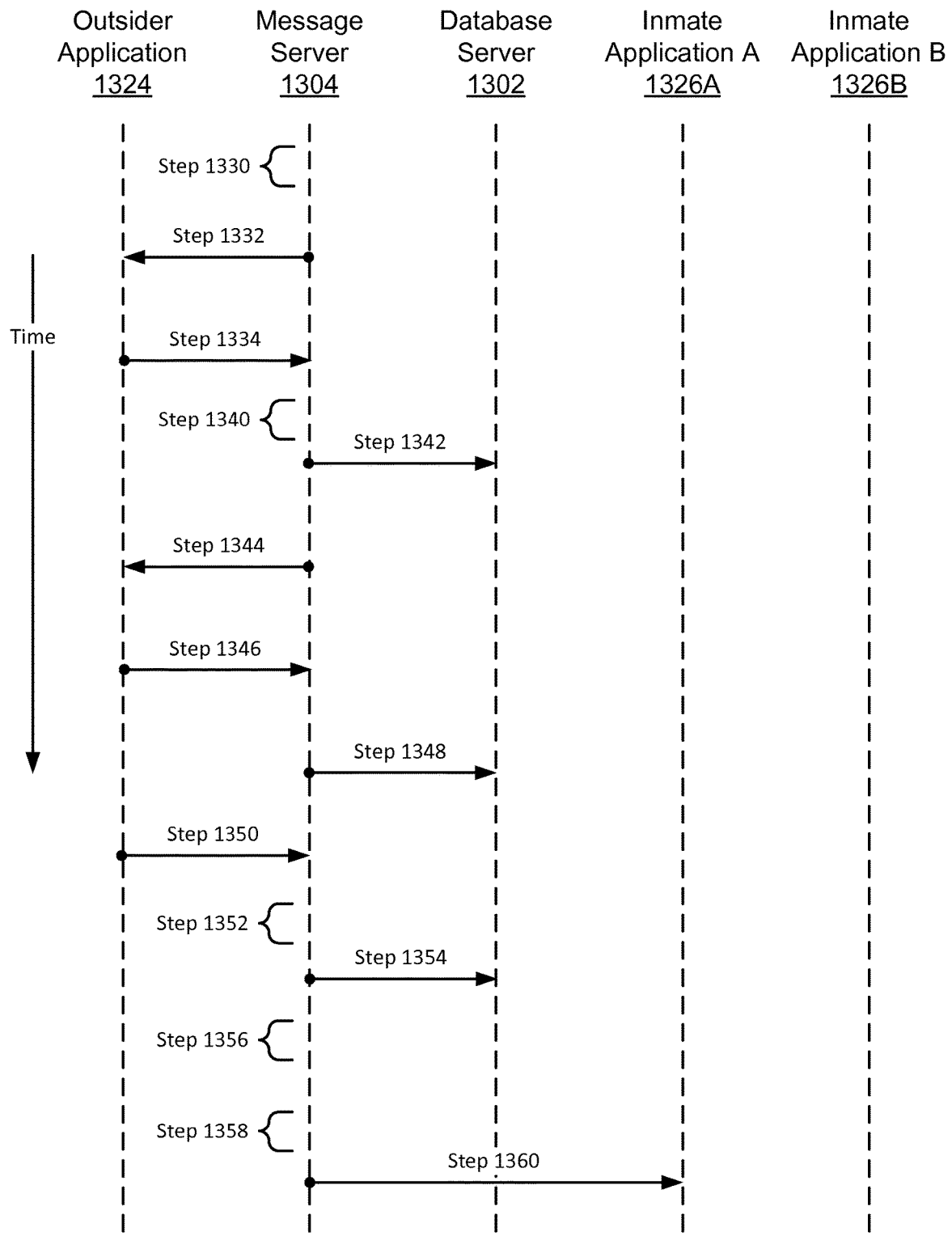
Figure 13C:
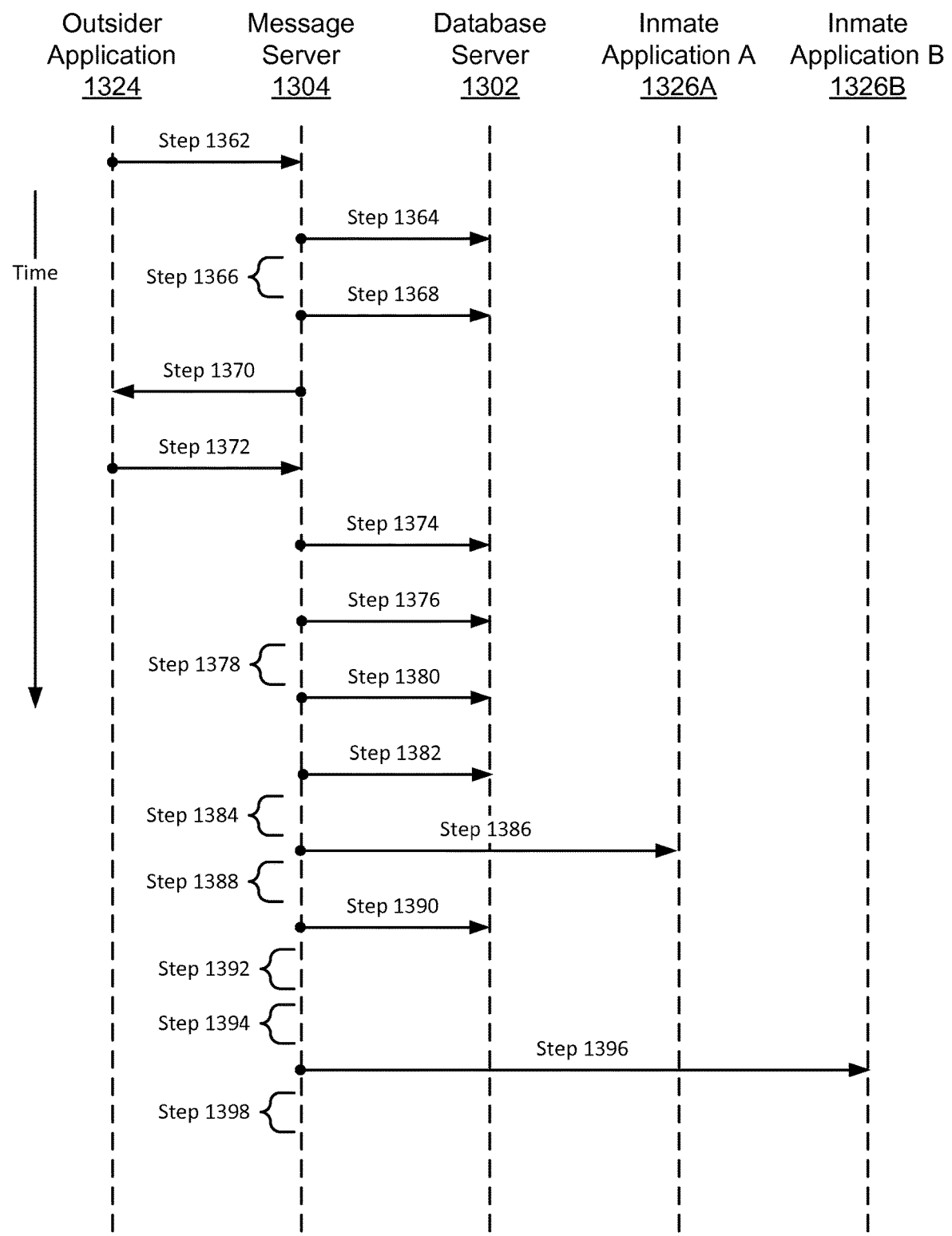

FIGS. 13A and 13B show an example in accordance with one or more embodiments of the invention. Specifically, FIG. 13A shows an example system in accordance with one or more embodiments of the invention. As shown in FIG. 13A, the example includes an application server (1300) is communicatively coupled to a database server (1302), inmate application A (1326A), inmate application B (1326B), and an outsider application (1324). The application server (1300) includes a message server (1304). The database server (1302) includes three identity data items (identity data item A (1306A), identity data item B (1306B), identity data item C (1306C)) and a master hashtag library (1308). Each identity data item (i.e., identity data item A (1306A), identity data item B (1306B), identity data item C (1306C)) includes a SSN member identifier (i.e., SSN member identifier A (1310A), SSN member identifier B (1310B), and SSN member identifier C (1310C)), an approved contact list (i.e., approved contact list A (1312A), approved contact list B (1312B), and approved contact list C (1312C)), a contact update list (i.e., contact update list A (1314A), contact update list B (1314B), and contact update list C (1314C)), an SSN member name(s) (i.e., SSN member name(s) A (1316A), SSN member name(s) B (1316B), and SSN member name(s) C (1316C)), a device unique identifier(s) (i.e., device unique identifier(s) A (1318A), device unique identifier(s) B (133318B), and device unique identifier(s) C (1318C)), a device protocol (i.e., device protocol A (1320A), device protocol B (1320B), and device protocol C (1320C)), and user hashtag definitions (user hashtag definitions A (1322A), user hashtag definitions B (1322B), and user hashtag definitions C (1322C)).

FIG. 13B shows an example timeline in accordance with one or more embodiments of the invention. Specifically, FIG. 13B shows an example interaction between the elements shown in FIG. 13A. For the purposes of the example, assume the outsider application (1324) is executing on smart phone (1328) operated by Mary Smith, inmate application A (1326A) is operated by John Anderson at an inmate kiosk (not shown), and inmate application B (1326B) is operated by John Blake on an inmate computing device (not shown). Assume further, that identity data item A (1306A) is associated with John Anderson, identity data item B (1306B) is associated with John Blake, and identity data item C (1306C) is associated with Mary Smith. For the purposes of the example, assume that Mary Smith, John Anderson, and John Blake are all authenticated members of the SSN. Assume that Mary Smith's SSN member identifier is SMITH00, John Anderson's SSN member identifier is ANDERSON00, and John Blake's SSN member identifier is BLAKE00. Assume further that Mary Jones has ANDERSON00 and BLAKE00 listed in her approved contact list C (1312C).

Steps 1330 to Step 1348 utilize an embodiment of the process described in FIG. 8.

In Step 1330, Mary Smith, operating a visitor kiosk (not shown), sends a request to the message server (1304) to add her new smart phone (1328) to her SSN account. Assume that the request includes the phone number of Mary's new smart phone (1328). In Step 1332, the message server (1304) verifies that the smart phone (1328) is associated with the SSN member by sending a SMS message containing a verification code to the phone number received in the request. In Step 1334, the message server (1304) receives the verification code from the visitor kiosk (not shown) on which Mary Smith has been authenticated.

In Step 1336, the message server (1304) sends a functionality test to the smart phone (1328). In Step 1338, the message server (1304) receives a response from the smart phone (1320) in response to the functionality test. In Step 1340, the message server (1304) determines that the functionality test is successful and that Mary's new smart phone (1328) is capable of receiving messages using the SMS protocol, EMS protocol, and the MMS protocol. In Step 1342, the message server (1304) stores these protocols in device protocol C (1320C).

In Step 1344, the message server (1304) sends a list of Mary's SSN member contacts listed in approved contact list C (1312C) to smart phone (1328). Because smart phone (1328) is capable of receiving MMS messages, the message server (1304) sends pictures of each one of Mary's SSN contacts. In Step 1346, the message server receives a response from smart phone (1328) indicating that Mary would like to receive notifications about John Anderson and John Smith. In Step 1348, ANDERSON00 and BLAKE00 are added to contact update list C (1314C).

Steps 1350 to Step 1360 utilize an embodiment of the process described in FIG. 9 and FIG. 10.

Assume that prior to Step 1350, Mary, using smart phone (1328), has been exchanging messages with John Anderson, who is using inmate application A (1326) on an inmate kiosk (not shown). In Step 1350, Mary sends the following SMS message: "~john I hope you are comfortable in there". Assume that the "~" is used on the SSN to indicate a SSN member name (as opposed to a SSN member identity). In Step 1352, the message server (1304) receives the message and determines that it is not a system command. Also in Step 1352, the message server (1304) determines that the message is not targeting an SSN member identifier. In Step 1354, the message server (1304) retrieves SSN member name(s) C (1316C) from the database server (1302) and compares the member name "~john" to the member names listed in SSN member name(s) C (1316C). Assume for the purposes of the example, that SSN member name(s) C (1316C) includes two entries for "~john". In Step 1356, the message server (1304), determines that there is at least one match for "~john" in SSN member name(s) C (1316C), and there is in fact two matches for "~john" in SSN member name(s) C (1316C).

In Step 1358, the message server (1304) attempts to predict the intended recipient. Continuing with Step 1358, the message server (1304) determines how much time has passed since Mary Smith and John Anderson exchanged messages. Assume that it has been five minutes since the last message was exchanged between Mary Smith and John Anderson. Also in Step 1358, the message server (1304) determines how much time has passed since Mary Smith and John Blake exchanged messages. Assume that it has been three days since the last message was exchanged between Mary Smith and John Blake.

Also in Step 1358, the message server (1304) determines that John Anderson is the likely intended recipient based on the fact that Mary Smith and John Anderson have far more recently exchanged messages. In Step 1360, the message server (1304) sends the message "~john I hope you are comfortable in there" to inmate application A (1326A).

Steps 1362 to Step 1376 utilize an embodiment of the process described in FIG. 12.

In Step 1362, Mary Smith composes and sends the following MMS message from smart phone (1328): "@ANDERSON00 @BLAKE00 you guys are the best! #GOS". The MMS message also includes a picture of Mary. Assume that the "@" symbol indicates a SSN member identifier. Assume also that this is the first time that Mary Smith has used the hashtag "#GOS". In Step 1364, the message server (1304) determines that the message includes a hashtag, and retrieves user hashtag definition C (1322C). In Step 1366, the message server (1304) determines that #GOS is not listed in user hashtag definition C (1322C). In Step 1368, the message server (1304) accesses the master hashtag library (1308) and determines that the master hashtag library (1308) lists the definition of #GOS as "Going on Strike".

In Step 1370, the message server (1304) sends a message to smart phone (1328) requesting that Mary Smith indicate whether she intended the definition of #GOS to be "Going on Strike" or would like to add a new definition for #GOS. In Step 1372, the message server (1304) receives a message from smart phone (1328) indicating that Mary Smith intended the meaning of #GOS to be "Getting Out Soon". In Step 1374, the message server (1304) accesses the master hashtag library (1308) and stores "Getting Out Soon" as an additional definition for #GOS. In Step 1376, the message server (1304) accesses user hashtag definition C (1322C) and stores "Getting Out Soon" as a definition for #GOS.

Steps 1378 to Step 1398 utilize an embodiment of the process described in FIG. 11.

In Step 1378, the message server (1304) determines the protocol of the message sent by Mary Smith in Step 1362. In Step 1380, the message server (1304) obtains the list of SSN members listed as recipients in the message (ANDERSON00 and BLAKE00). In Step 1382, the message server (1304) selects ANDERSON00 and retrieves device protocol A (1320A) from the database server (1302). Assume that device protocol A indicates that John Anderson's device (an inmate kiosk) is compatible with the MMS protocol. In Step 1384, the message server (1304) determines that ANDERSON00's device is compatible with the MMS protocol. In Step 1386, the message server (1304) sends the message to ANDERSON00's device (using the device unique identifier listed in device unique identifier(s) A (1318A). In Step 1388, the message server (1304) removes ANDERSON00 from the recipient list, and determines that the recipient list is not empty.

In Step 1390, the message server (1304) selects BLAKE00 and retrieves device protocol B (1320B) from the database server (1302). Assume that device protocol B indicates that John Blake's device (an inmate computing device) is compatible with the SMS protocol, but not the EMS protocol or the MMS protocol. In Step 1392, the message server (1304) determines that BLAKE00's device is not compatible with the MMS protocol. In Step 1394, the message server (1304) converts the picture to the text "<missing photo>" and inserts the text into the message. In Step 1396, the message server (1304) sends the message to BLAKE00's device (using the device unique identifier listed in device unique identifier(s) B (1318B). In Step 1398, the message server (1304) removes BLAKE00 from the recipient list, and determines that the recipient list is empty.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for handing messages on a secure social network (SSN) comprising:
   receiving a message comprising a recipient name from a SSN member sender;
   retrieving a list of SSN member names approved to communicate with the SSN member sender;
   determining that the recipient name matches a first SSN member name and a second SSN member name stored in the list of SSN member names, wherein the first SSN member name and the second SSN member name identify two separate inmates of a controlled facility;
   retrieving a first period of time since a previous communication between the SSN member sender and the first SSN member name;
   retrieving a second period of time since a previous communication between the SSN member sender and the second SSN member name;
   selecting, from the two separate inmates and based on the first period of time exceeding the second period of time, a selected inmate identified by the second SSN member name;
   retrieving, from an identity data item of the selected inmate, a device protocol of a device of the selected inmate;
   converting, in response to retrieving the device protocol, the message to be compatible with the device protocol; and
   sending, in response to converting, the message to the selected inmate.

2. The method of claim 1, wherein sending the message to the selected inmate comprises:
   determining a message protocol of the message,
   wherein converting is based on comparing the message protocol to the device protocol.

3. The method of claim 2, wherein the message protocol is one selected from a group consisting of a multimedia messaging service protocol, a short messaging service protocol, and an enhanced messaging service protocol.

4. The method of claim 1, wherein receiving the message comprising the recipient name from the SSN member sender comprises:
   determining that the message further comprises a hashtag;
   sending the SSN member sender a request to define the hashtag;
   receiving a hashtag definition for the hashtag; and
   storing the hashtag definition in a user hashtag definition for the SSN member sender.

5. The method of claim 4, wherein sending the SSN member sender the request to define the hashtag comprises:
   retrieving, from a master hashtag library, at least one definition for the hashtag; and
   sending the at least one definition to the SSN member sender.

6. The method of claim 4, further comprising:
   storing the hashtag definition in a master hashtag library for all members of the SSN.

7. The method of claim 1, wherein the SSN member sender is an outsider.

8. The method of claim 1, wherein the method further comprises determining that the first SSN member name corresponds to a previous inmate of the controlled facility.

9. The method of claim 8, wherein the method further comprises sending a bounceback message to the SSN member sender.

10. The method of claim 1, wherein the method further comprises:
    determining that the first SSN member name corresponds to a previous inmate of the controlled facility and a current inmate of the controlled facility;
    determining that the message was delivered to an incorrect SSN member name; and
    sending a bounceback message to the SSN member sender.

11. A non-transitory computer readable medium comprising instructions that, when executed by a processor, perform a method for handing messages on a secure social network (SSN), the method comprising:
    receiving a message comprising a recipient name from a SSN member sender;
    determining that the message further comprises a hashtag that is not defined in a user hashtag definition of the SSN member sender;
    retrieving, in response to determining that the hashtag is not defined in the user hashtag definition of the SSN member sender, a plurality of definitions for the hashtag from a master hashtag library;

receiving a selection from the SSN member sender to identify a sender selected hashtag definition from the plurality of definitions for the hashtag;

retrieving a list of SSN member names approved to communicate with the SSN member sender;

determining that the recipient name matches a SSN member name stored in the list of SSN member names, wherein the SSN member name identifies an inmate of a controlled facility;

retrieving, from an identity data item of the inmate, a device protocol of a device of the inmate;

converting, in response to retrieving the device protocol, the message to be compatible with the device protocol; and sending, in response to converting, the message to the inmate, wherein the hashtag provides information about the message based on the sender selected hashtag definition.

12. The non-transitory computer readable medium of claim 11, wherein sending the message to the inmate comprises:
   determining a message protocol of the message;
   wherein the converting is based on comparing the message protocol to the device protocol.

13. The non-transitory computer readable medium of claim 12, wherein the message protocol is one selected from a group consisting of a multimedia messaging service protocol, a short messaging service protocol, and an enhanced messaging service protocol.

14. The non-transitory computer readable medium of claim 11, further comprises:
   storing, in response to determining that the hashtag is not defined in the user hashtag definition of the SSN member sender and receiving the selection from the SSN member sender, the sender selected hashtag definition in the user hashtag definition for the SSN member sender.

15. The non-transitory computer readable medium of claim 14, further comprises:
   sending the plurality of definitions to the SSN member sender for selection.

16. The non-transitory computer readable medium of claim 14, the method further comprising:
   storing, prior to receiving the message, the plurality of definitions in the master hashtag library for all members of the SSN.

17. The non-transitory computer readable medium of claim 11, wherein the SSN member sender is an outsider.

18. The non-transitory computer readable medium of claim 11, wherein the method further comprises determining that the first SSN member name corresponds to a previous inmate of the controlled facility.

19. The non-transitory computer readable medium of claim 18, wherein the method further comprises sending a bounceback message to the SSN member sender.

20. The non-transitory computer readable medium of claim 11, wherein the method further comprises:
   determining that the first SSN member name corresponds to a previous inmate of the controlled facility and a current inmate of the controlled facility;
   determining that the message was delivered to an incorrect SSN member name; and
   sending a bounceback message to the SSN member sender.

21. A system for reviewing a posting to a secure social network (SSN) comprising:
   a database server comprising:
      a list of SSN member names approved to communicate with a SSN member sender comprising:
         a first SSN member name identifying an inmate of a controlled facility; and
         a second SSN member name; and
   an application server configured to:
      receive a message comprising a recipient name from the SSN member sender;
      retrieve the list of SSN member names approved to communicate with the SSN member sender;
      determine that the recipient name matches the first SSN member name and the second member name stored in the list of SSN member names, wherein the first SSN member name and the second SSN member name identify two separate inmates of the controlled facility;
      retrieve a first period of time since a previous communication between the SSN member sender and the first SSN member name;
      retrieve a second period of time since a previous communication between the SSN member sender and the second SSN member name;
      select, from the two separate inmates and based on the first period of time exceeding the second period of time, a selected inmate identified by the second SSN member name;
      retrieve, from an identity data item of the selected inmate, a device protocol of a device of the selected inmate;
      convert, in response to retrieving the device protocol, the message to be compatible with the device protocol; and
      send, in response to converting, the message to the selected inmate.

22. The system of claim 21, wherein sending the message to the selected inmate comprises:
   determining a message protocol of the message,
   wherein the converting is based on comparing the message protocol to the device protocol.

23. The system of claim 22, wherein the message protocol is one selected from a group consisting of a multimedia messaging service protocol, a short messaging service protocol, and an enhanced messaging service protocol.

24. The system of claim 21, wherein receiving the message comprising the recipient name from the SSN member sender comprises:
   determining that the message further comprises a hashtag;
   sending the SSN member sender a request to define the hashtag;
   receiving a hashtag definition for the hashtag; and
   storing the hashtag definition in a user hashtag definition for the SSN member sender.

25. The system of claim 24, wherein sending the SSN member sender the request to define the hashtag comprises:
   retrieving, from a master hashtag library, at least one definition for the hashtag; and
   sending the at least one definition to the SSN member sender.

26. The system of claim 24, wherein the application server is further configured to:
   store the hashtag definition in a master hashtag library for all members of the SSN.

27. The system of claim 21, wherein the method further comprises determining that the first SSN member name corresponds to a previous inmate of the controlled facility.

28. The system of claim 27, wherein the method further comprises sending a bounceback message to the SSN member sender.

29. The system of claim 21, wherein the method further comprises:
- determining that the first SSN member name corresponds to a previous inmate of the controlled facility and a current inmate of the controlled facility;
- determining that the message was delivered to an incorrect SSN member name; and
- sending a bounceback message to the SSN member sender.

* * * * *